US012279263B2

(12) United States Patent
Nam et al.

(10) Patent No.: US 12,279,263 B2
(45) Date of Patent: Apr. 15, 2025

(54) TECHNIQUES FOR SIDELINK SENSING AND POSITIONING

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Sony Akkarakaran, Poway, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/513,457

(22) Filed: Nov. 17, 2023

(65) Prior Publication Data

US 2024/0163875 A1     May 16, 2024

Related U.S. Application Data

(63) Continuation of application No. 17/401,945, filed on Aug. 13, 2021, now Pat. No. 11,832,253.

(51) Int. Cl.
*H04W 72/20* (2023.01)
*H04L 5/00* (2006.01)
*H04W 72/0446* (2023.01)

(52) U.S. Cl.
CPC ........... *H04W 72/20* (2023.01); *H04L 5/0048* (2013.01); *H04W 72/0446* (2013.01)

(58) Field of Classification Search
CPC . H04W 72/20; H04W 72/0446; H04W 64/00; H04W 76/14; H04L 5/0048; H04L 5/00; G01S 5/0205

See application file for complete search history.

(56) References Cited

U.S. PATENT DOCUMENTS 9,462,448 B2 * 10/2016 Edge .................... G01S 1/20
2021/0219268 A1    7/2021 Li et al.
(Continued)

FOREIGN PATENT DOCUMENTS

CN         115706627 A  *  2/2023  ........... H04L 5/0005
EP           4270828 A1  * 11/2023  ............... G01S 5/02
(Continued)

OTHER PUBLICATIONS

International Search Report and Written Opinion—PCT/US2022/035154—ISA/EPO—Jan. 2, 2023.

*Primary Examiner* — Ayaz R Sheikh
*Assistant Examiner* — Louis Samara
(74) *Attorney, Agent, or Firm* — Arun Swain

(57) ABSTRACT

This disclosure provides systems, methods and apparatus, for measurement and reporting procedures associated with a sidelink positioning reference signal (SL-PRS). In one aspect, a first user equipment (UE), which may function as a sidelink anchor node, may transmit an SL-PRS to a second UE in accordance with a slot format or structure that is dedicated for SL-PRS transmissions. The first UE may select resources for the transmission of the SL-PRS via sensing and exclusion or using a set of resources that are dedicated for SL-PRS transmissions. The second UE may receive the SL-PRS and use the SL-PRS to acquire positioning information, in accordance with an observed time difference of arrival (OTDOA)-based positioning method, or may transmit a second SL-PRS to the first UE to facilitate acquisition of positioning information at the first UE, in accordance with a round-trip-time (RTT)-based positioning method.

19 Claims, 9 Drawing Sheets

(56) References Cited

U.S. PATENT DOCUMENTS

| | | | |
|---|---|---|---|
| 2021/0333353 A1* | 10/2021 | Busin | G01S 5/0244 |
| 2022/0166575 A1* | 5/2022 | Yerramalli | H04W 72/0453 |
| 2022/0393820 A1* | 12/2022 | Keating | H04W 76/14 |
| 2023/0030759 A1* | 2/2023 | Wu | H04W 4/02 |
| 2023/0051721 A1* | 2/2023 | Fong | H04W 72/20 |
| 2023/0052126 A1 | 2/2023 | Nam et al. | |
| 2023/0062805 A1* | 3/2023 | Baek | H04L 5/0051 |
| 2023/0397150 A1 | 12/2023 | Baek et al. | |
| 2024/0179667 A1* | 5/2024 | Zheng | H04L 5/0032 |

FOREIGN PATENT DOCUMENTS

| | | | | |
|---|---|---|---|---|
| WO | WO-2020145802 A1 * | 7/2020 | | H04L 1/1812 |
| WO | WO-2020159339 A1 * | 8/2020 | | G01S 5/0205 |
| WO | WO-2021086114 A1 * | 5/2021 | | G01S 5/0072 |
| WO | WO-2021133104 A1 * | 7/2021 | | H04L 5/0048 |
| WO | WO-2022120735 A1 * | 6/2022 | | |
| WO | WO-2022139093 A1 * | 6/2022 | | G01S 5/02 |

* cited by examiner

TECHNIQUES FOR SIDELINK SENSING AND POSITIONING

CROSS-REFERENCE TO RELATED APPLICATIONS

This application is a continuation of U.S. Non-Provisional application Ser. No. 17/401,945, entitled "TECHNIQUES FOR SIDELINK SENSING AND POSITIONING", filed Aug. 13, 2021, the entire content of which is incorporated herein by reference as if fully set forth below in its entirety and for all applicable purposes.

TECHNICAL FIELD

This disclosure relates to wireless communications, including techniques for sidelink sensing and positioning.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may communicate with one or more other UEs via one or more sidelinks. In some such systems, UEs may communicate with each other using resources that are scheduled or allocated to the UEs by one or more components of a network entity, such as a BS. For example, one or more components of the BS may allocate a resource pool for sidelink communications and two or more UEs may communicate with each other using resources from the allocated resource pool.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications. The method may include receiving, at a wireless device, control information indicating resources allocated for selection by wireless devices for performing sidelink communications and transmitting, by the wireless device, a positioning reference signal (PRS) in accordance with a transmission time interval (TTI) associated with the resources allocated for selection by wireless devices for performing sidelink communications.

Another innovative aspect of the subject matter described in this disclosure can be implemented in an apparatus for wireless communications. The apparatus may include a first interface configured to obtain, at a wireless device, control information indicating resources allocated for selection by wireless devices for performing sidelink communications. In some implementations, the apparatus may include the first interface or a second interface configured to output, by the wireless device, a PRS in accordance with a TTI associated with the resources allocated for selection by wireless devices for performing sidelink communications. In some implementations, the apparatus may include a processor.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive, at a wireless device, control information indicating resources allocated for selection by wireless devices for performing sidelink communications and transmit, by the wireless device, a PRS in accordance with a TTI associated with the resources allocated for selection by wireless devices for performing sidelink communications.

Another innovative aspect of the subject matter described in this disclosure can be implemented in another apparatus for wireless communications. The apparatus may include means for receiving, at a wireless device, control information indicating resources allocated for selection by wireless devices for performing sidelink communications and means for transmitting, by the wireless device, a PRS in accordance with a TTI associated with the resources allocated for selection by wireless devices for performing sidelink communications.

Another innovative aspect of the subject matter described in this disclosure can be implemented in a non-transitory computer-readable medium storing code for wireless communications. The code may include instructions executable by a processor to receive, at a wireless device, control information indicating resources allocated for selection by wireless devices for performing sidelink communications and transmit, by the wireless device, a PRS in accordance with a TTI associated with the resources allocated for selection by wireless devices for performing sidelink communications.

Some implementations of the method, apparatuses, and non-transitory computer-readable medium described herein may further include operations, features, means, or instructions for receiving, from a second wireless device, a PRS request, and transmitting the PRS may be associated with receiving the PRS request.

Some implementations of the method, apparatuses, and non-transitory computer-readable medium described herein may further include operations, features, means, or instructions for receiving, from a second wireless device, a second PRS in response to transmitting the PRS.

In some implementations of the method, apparatuses, and non-transitory computer-readable medium described herein, the TTI may include a slot format that is dedicated for sidelink PRS transmission.

In some examples of the method, apparatuses, and non-transitory computer-readable medium described herein, the slot format includes a physical sidelink control channel (PSCCH) portion, a second stage sidelink control information (SCI) portion, one or more demodulation reference signal (DMRS) portions, a PRS burst portion, and one or more gap durations adjacent to the PRS burst portion.

One innovative aspect of the subject matter described in this disclosure can be implemented in a method for wireless communications. The method may include receiving, at a first wireless device, control information indicating resources allocated for selection by wireless devices for performing sidelink communications and receiving, at the first wireless device from a second wireless device, a PRS using the indicated resources allocated for selection by wireless devices for performing sidelink communications.

Another innovative aspect of the subject matter described in this disclosure can be implemented in an apparatus for wireless communications. The apparatus may include a first interface configured to obtain, at a first wireless device, control information indicating resources allocated for selection by wireless devices for performing sidelink communications. In some implementations, the apparatus may include the first interface or a second interface configured to obtain, at the first wireless device from a second wireless device, a PRS using the indicated resources allocated for selection by wireless devices for performing sidelink communications. In some implementations, the apparatus may include a processor.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive, at a first wireless device, control information indicating resources allocated for selection by wireless devices for performing sidelink communications and receive, at the first wireless device from a second wireless device, a PRS using the indicated resources allocated for selection by wireless devices for performing sidelink communications.

Another innovative aspect of the subject matter described in this disclosure can be implemented in another apparatus for wireless communications. The apparatus may include means for receiving, at a first wireless device, control information indicating resources allocated for selection by wireless devices for performing sidelink communications and means for receiving, at the first wireless device from a second wireless device, a PRS using the indicated resources allocated for selection by wireless devices for performing sidelink communications.

Another innovative aspect of the subject matter described in this disclosure can be implemented in a non-transitory computer-readable medium storing code for wireless communications. The code may include instructions executable by a processor to receive, at a first wireless device, control information indicating resources allocated for selection by wireless devices for performing sidelink communications and receive, at the first wireless device from a second wireless device, a PRS using the indicated resources allocated for selection by wireless devices for performing sidelink communications.

Some implementations of the method, apparatuses, and non-transitory computer-readable medium described herein may further include operations, features, means, or instructions for transmitting a PRS request, and receiving the PRS may be associated with transmitting the PRS request.

Some implementations of the method, apparatuses, and non-transitory computer-readable medium described herein may further include operations, features, means, or instructions for receiving, via SCI associated with the PRS, an indication of a position of the second wireless device and an indication of a transmission timing of the PRS from the second wireless device, where the position of the first wireless device may be determined using the indicated position of the second wireless device and the indicated transmission timing of the PRS from the second wireless device.

Some implementations of the method, apparatuses, and non-transitory computer-readable medium described herein may further include operations, features, means, or instructions for transmitting a second PRS, and receiving the PRS may be associated with transmitting the second PRS.

Some implementations of the method, apparatuses, and non-transitory computer-readable medium described herein may further include operations, features, means, or instructions for receiving, via SCI associated with the PRS, an indication of a slot format dedicated for PRS transmissions and receiving the PRS in accordance with the indicated slot format.

In some implementations of the method, apparatuses, and non-transitory computer-readable medium described herein, the slot format includes a PSCCH portion, a second stage SCI portion, one or more DMRS portions, one or more gap durations, and a PRS burst portion.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
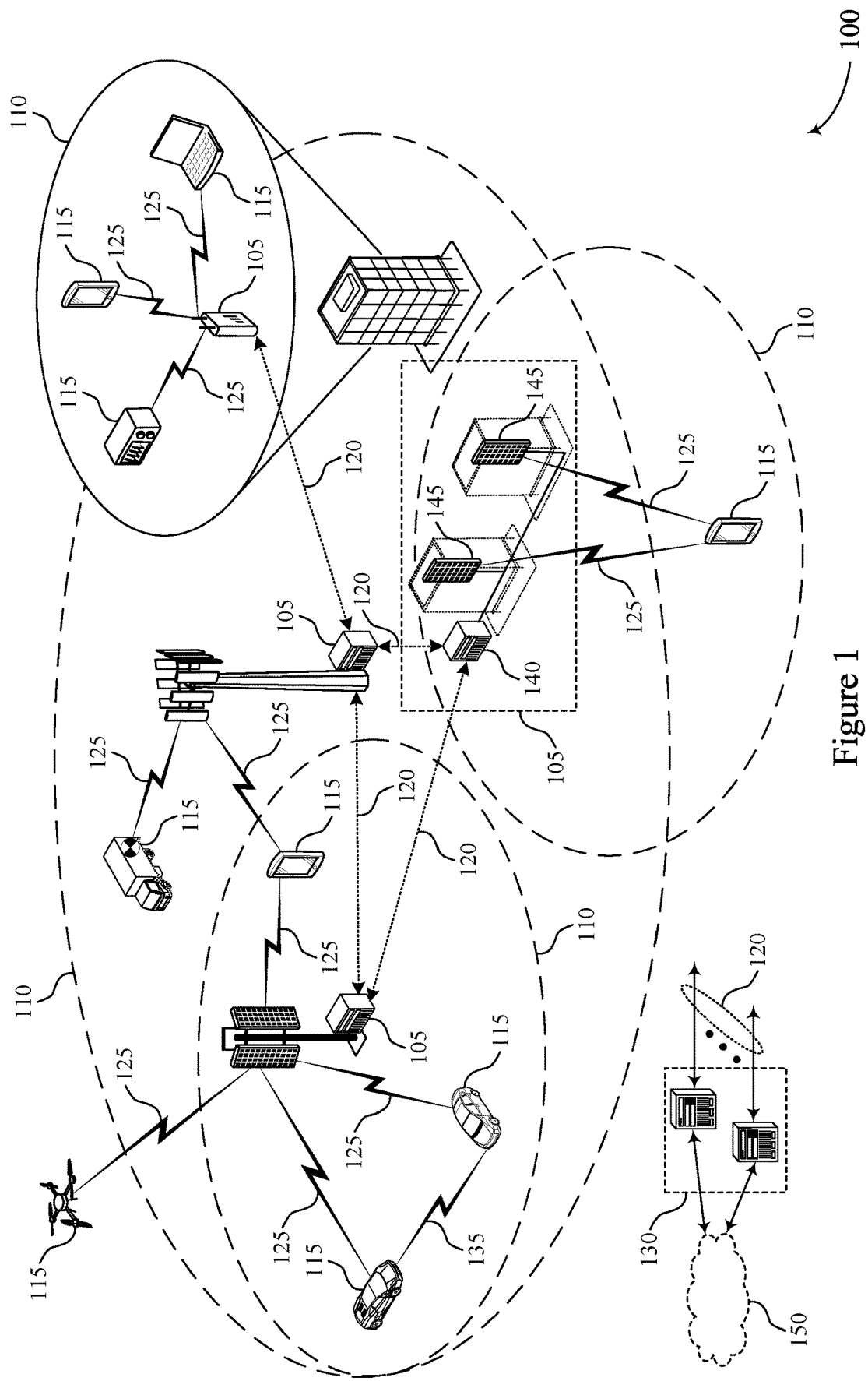
FIG. 1 illustrates an example wireless communications system that supports techniques for sidelink sensing and positioning.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, one or more aspects of wireless communications may depend on or be associated with relative positioning between devices of the system and, to assist with positioning knowledge among devices, one or more devices may transmit a positioning reference signal (PRS) that may be received by one or more other devices within the system. For example, a network entity (which may be an example of one or more components of a base station (BS)) may transmit one or more PRSs to other devices within the system to facilitate acquisition or determination of positioning information, which may include an absolute position, a relative position, a relative distance, or a relative orientation, among other types of positioning information. In some deployment scenarios, one or more UEs may experience relatively poor channel conditions, such as an out-of-coverage (OoC) condition, or may otherwise lack a line-of-sight (LOS) or other communication link with a network entity, and such UEs may be unable to receive PRSs that may be transmitted by a network entity. Moreover, in some circumstances, a UE may be within a coverage area of relatively few network entities (for example, a single network entity), or within a coverage area of network entities that are relatively close together, which may limit a quality of positioning information even when transmitted PRSs may be received by the UE. To facilitate a determination or inference of positioning information under these and other scenarios, a communication system may support transmission of PRSs using sidelink communications, where such a PRS may be referred to as a sidelink PRS (SL-PRS). Such techniques may include transmission of an SL-PRS from a first UE (such as an anchor sidelink node) that may be received by one or more other UEs, which may improve a capability for determining positioning information of UEs, or may improve a quality of such positioning information, among other benefits, by providing a greater quantity of PRSs or a more diverse pool of PRS transmitters for determining the positioning information.

In some implementations, one or more aspects of sidelink communication may be associated with a distributed coordination of communications between UEs, such as when UEs are in an OoC condition or otherwise lack a communications link with a network entity, or when UEs perform sidelink communications using resources that are allocated to or are otherwise available for selection or reservation by the UEs (for example, without the sidelink communications themselves being scheduled by a network entity). For example, a pool of resources (such as communication resources in the frequency domain, resources in the time domain, or a combination thereof) may be allocated by a network entity (such as during a communication link establishment or other configuration with the network), and allocated in accordance with a communications protocol or standard, and UEs may contend for use of such resources in accordance with various sensing and exclusion techniques.

An example of such an allocation and reservation of resources for sidelink communications may be referred to as a sidelink resource allocation Mode 2. Under such circumstances, reference signal transmissions, among other transmissions, may be aperiodic or semi-persistently scheduled (for example, sent in response to a request).

To support positioning techniques that utilize SL-PRS transmissions under resource allocations that implement distributed coordination, such as a Mode 2 resource allocation, one or more aspects of the present disclosure may support mutually understood procedures and channel structures for SL-PRS measurement and reporting. For example, a UE may transmit an SL-PRS in accordance with a slot format or structure that is dedicated to or exclusively used for SL-PRSs and, in some implementations, such a slot format may be used in a transmission over frequency resources that also may be available for data communications (for example, supporting in-band sidelink sensing and positioning). Such a slot format may include a physical sidelink control channel (PSCCH) portion carrying first stage sidelink control information (SCI-1), a portion carrying second stage sidelink control information (SCI-2), a demodulation reference signal (DMRS) portion, and a portion for the SL-PRS, such as an SL-PRS burst portion. In some implementations, such a slot format may exclude or omit a data portion. For example, the slot formation may exclude or omit a physical sidelink shared channel (PSSCH) portion. In some implementations, an SL-burst portion may occupy a portion (such as a set of symbols or symbol indices) of the slot format that is dedicated for SL-PRSs that, in other slot formats for sidelink communications, is occupied by a data portion (such as a set of symbols or symbol indices that are occupied by a PSSCH in other slot formats). In some implementations, a UE may transmit an SL-PRS in accordance with an SL-PRS pattern and may indicate the SL-PRS pattern to one or more receiving UEs via sidelink control signaling, such as one or more indications of SCI-2.

In some implementations, a UE may transmit an SL-PRS using a transmit power that is different than a transmit power used for other sidelink transmissions and, in some implementations, the UE may transmit the SL-PRS using a transmit power that is different than a transmit power used for other portions of the same slot. For example, a UE may use a first transmit power for SCI-1, SCI-2, and DMRSs of a slot and may use a second transmit power (such as a higher transmit power) for an SL-PRS of the slot. In such implementations, the slot format may include one or more gap portions (for example, gap durations) that precede an SL-PRS burst, follow an SL-PRS burst, or both, which may support an adjustment of transmit power by the UE, among other operations. A UE also may employ various techniques for acquiring or reserving resources (from an allocated resource pool, such as a resource pool that is also allocated for sidelink communication) over which to transmit the SL-PRS and may include information (such as a position of the UE, or a transmit time stamp for the SL-PRS, among other information) within sidelink control information (SCI), such as SCI-1 or SCI-2, to assist a receiving UE with acquiring positioning information.

Particular implementations of the subject matter described in this disclosure can be implemented to realize one or more of the following potential advantages. For example, as a result of implementing one or more of the described procedures or channel structures for SL-PRS measurement and reporting, UEs may use resources allocated to or otherwise available for selection by UEs for sidelink communications to support more capable or higher quality determination or inference of positioning information. In some implementations, such techniques may increase operational performance or efficiency associated with public safety and other uses in which relative positioning between devices influences operational decisions. For example, in a factory deployment setting, a first UE associated with (for example, controlling) a first mechanical arm may operate more safely and accurately if the first UE has knowledge of a relative position or distance of a second UE associated with (for example, controlling) a second mechanical arm. In another example, a vehicle capable of autonomous driving may use relative positioning or ranging information between the vehicle and one or more roadside units (RSUs) to avoid collisions. In some implementations, sharing a same resource pool between sidelink communication and sidelink positioning may provide more efficient resource utilization for the system. Further, and as at least a result of more accurate positioning information, UEs may experience a greater likelihood for successful communication, greater system throughput, higher data rates, and greater spectral efficiency, among other examples.

FIG. 1 illustrates an example of a wireless communications system 100 that supports techniques for sidelink sensing and positioning. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined using a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined as a result of listening according to different receive configuration directions (for example, a beam direction determined to have a highest signal strength, highest signal-to-noise ratio (SNR), or otherwise acceptable signal quality as a result of listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

In some implementations, two or more UEs 115 may communicate with each other over sidelink resources in accordance with slot formats or structures that are dedicated for sidelink communication. Slot formats that are dedicated for sidelink communication may span various quantities of symbol durations in the time domain (for example, 12 symbol durations or 9 symbol durations), and may include a PSCCH portion, a PSSCH portion, one or more DMRS symbols, one or more gap symbols, or a physical sidelink feedback channel (PSFCH) portion, or any combination thereof. In some implementations, two-, three-, or four-symbol DMRS patterns may be configured (for example, pre-configured) for use by a transmitting UE 115. For example, the transmitting UE 115 may select a DMRS pattern and may indicate the selected DMRS pattern via SCI-1 (if more than one DMRS pattern is configured), which may be based on channel conditions. In some implementations, DMRS patterns may vary across twelve-symbol or nine-symbol PSSCHs, though DMRS patterns may be defined for other lengths. For twelve-symbol PSSCH DMRS patterns, a sidelink slot format may include two, three, or four DMRSs. For nine-symbol PSSCH DMRS patterns, a sidelink slot format may include two, or three DMRSs. In some implementations, slot formats associated with a nine-symbol PSSCH may include a PSFCH portion, and slot formats associated with a twelve-symbol PSSCH may not include a PSFCH portion.

In some systems, such as the wireless communications system 100, a UE 115 may receive control information (from another UE 115 or from one or more components of a BS 105) indicating resources allocated for selection by UEs 115 for performing sidelink communications. For example, one or more components of a BS 105 (which also may be referred to herein as a network entity), may allocate a resource pool to a set of UEs to be used for sidelink communications between the set of UEs. In some aspects, such a resource allocation may be referred to as a sidelink resource allocation Mode 2, and one or more components of the BS 105 may allocate resources in accordance with the sidelink resource allocation Mode 2 to support various deployment scenarios, including deployment scenarios in which at least some of the set of UEs are not within a coverage area or coverage condition associated with one or more components of the BS 105, or otherwise lack a LOS link with one or more components of the BS 105. During scenarios in which a UE 115 uses resources from a Mode 2 resource pool, or other implementations where a UE 115 senses an availability of allocated communication resources, the UE 115 may transmit reference signals, among other transmissions, in an aperiodic manner (such as in response to a request for the reference signal).

To support aperiodic communication of SL-PRSs, UEs 115 may transmit or receive SL-PRSs in accordance with a TTI format that is dedicated or exclusively used for SL-PRS transmissions. In various examples, a UE 115 may transmit the SL-PRS following a sensing and resource selection procedure, or may transmit the SL-PRS using resources from a set of resources that are dedicated or exclusively used for SL-PRS transmissions without sensing or reservation. A UE 115 receiving such a transmission may identify the transmission as an SL-PRS transmission based on control information included in the TTI format, and may calculate positioning information such as a range or distance from a transmitting UE 115 that transmits the SL-PRS, or may transmit a second SL-PRS in response to receiving the SL-PRS to facilitate a calculation of positioning information such as a range or distance at the transmitting UE 115.

Figure 2:
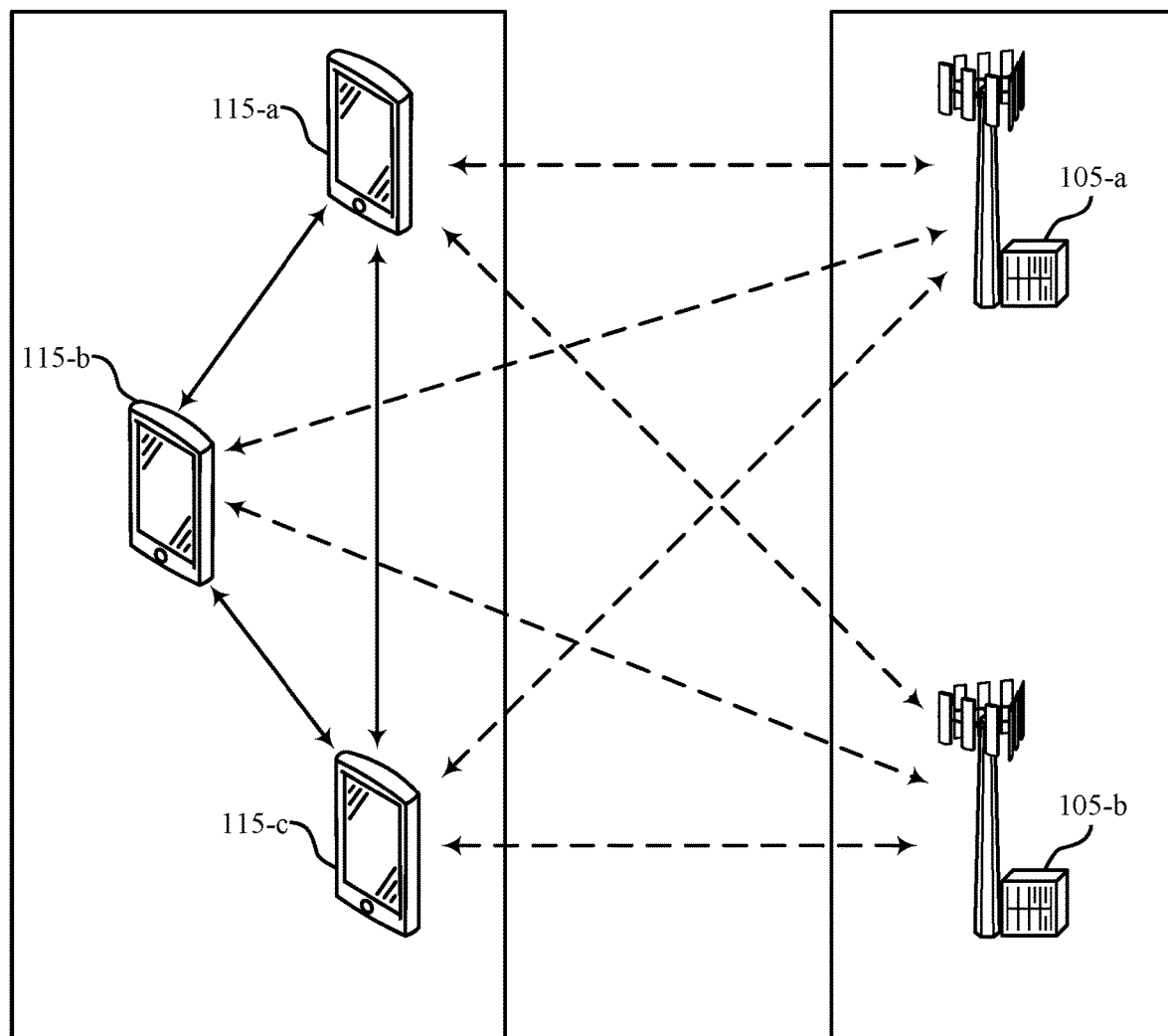
FIG. 2 illustrates an example signaling diagram that supports techniques for sidelink sensing and positioning.

FIG. 2 illustrates an example signaling diagram 200 that supports techniques for sidelink sensing and positioning. The signaling diagram 200 may implement or be implemented to realize aspects of the wireless communications system 100. For example, the signaling diagram 200 may illustrate communication between a set of UEs 115 (including a UE 115-*a*, a UE 115-*b*, or a UE 115-*c*) and a set of BSs 105 (including a BS 105-*a* or a BS 105-*b*), or a set of one or more components of BSs 105. In some implementations, the UE 115-*a*, the UE 115-*b*, and the UE 115-*c* may be examples of UEs 115 as described herein, including with reference to FIG. 1. In some implementations, the BS 105-*a* and the BS 105-*b* may be examples of BSs 105 or network entities described herein, including with reference to FIG. 1.

The signaling diagram 200 may support procedures and channel structures that devices (any one or more of the UEs 115 or the BSs 105) may use to facilitate an acquisition of positioning or ranging information, including one or more aspects of sidelink positioning. For example, a UE 115 (any one or more of the UE 115-*a*, the UE 115-*b*, or the UE 115-*c*) may receive a Uu-PRS 205 via a Uu communications link between the UE 115 and a BS 105, or may receive an SL-PRS 210 via a sidelink between the UE 115 and another UE 115 (such as a UE 115 that is an example of or functions as a sidelink anchor node), or may receive both a Uu-PRS 205 and an SL-PRS 210. A sidelink anchor node, which may be refer to a UE 115 that transmits an SL-PRS 210, may be any UE 115 associated with suitably accurate position information (for example, that already has accurate knowledge of its position), such as position information obtained from a global navigation satellite system (GNSS) or prior PRS signaling.

The transmission of SL-PRSs 210 may support a higher quantity of PRS transmitters (for example, using more LOS links), or a greater diversity of PRS transmitter locations, which may improve accuracy of UE positioning across various deployment scenarios and in various channel conditions. For example, for a UE 115 with poor channel conditions (such as a UE 115 having relatively few or no LOS Uu links), the transmission of SL-PRSs 210 from a sidelink anchor node may increase a quantity of LOS links over which the UE 115 may receive a PRS (either or both of Uu-PRSs 205 or SL-PRSs 210, where a total quantity of LOS links includes Uu and sidelink LOS links). In some implementations, such as in indoor factory deployments, a lack of or relatively few LOS links may be relatively common. For example, for some indoor factory channels (such as channels used for indoor factory-dense high or -dense low (InF-DH/DL) deployments), devices may have a relatively low probability for LOS links as a result of relative positioning of various devices and the potential for obstruction. For UEs 115 with good channel conditions (such as a UE 115 having a relatively large amount of LOS links), the additional ability to receive SL-PRSs 210 via SL LOS links may improve overall positioning accuracy by additional measurements (for example, as a result of receiving and measuring more SL-PRSs 210). In some implementations, an increase in Uu or sidelink LOS links may support power efficient P2P positioning or ranging for various uses or deployment scenarios, such as public safety uses.

Additionally, or alternatively, a UE 115 may perform sidelink "sensing" (positioning for a device-free object), which may be performed in a joint framework with sidelink positioning. For example, a UE 115 may perform sensing to detect a device-free object (such as a passive object that may not have a communication capability) using an SL-PRS 210 (as well as a Uu-PRS 205) as a radar signal. As such, a UE 115 may perform positioning and sensing in a same framework (such as a same signaling framework), where positioning may be related to or otherwise associated with a measurement of one or more LOS components of a PRS, and sensing may be related to or otherwise associated with a measurement of one or more non-LOS (NLOS) components of a PRS. In some implementations, such one or more NLOS components may refer to a reflection from the object.

A UE 115 may communicate with one or more other UEs 115 in accordance with various sidelink communication or resource allocation modes. For example, one or more components of a BS 105 may configure the UEs 115 to communicate in accordance with a sidelink communication or resource allocation Mode 1 or a sidelink communication or resource allocation Mode 2. In examples in which one or more components of the BS 105 configure the UEs 115 to communicate in accordance with the sidelink communication or resource allocation Mode 1, one or more components of the BS 105 may schedule sidelink communication between the UEs 115 and may allocate resources for the UEs 115 to perform the scheduled communication. In examples in which one or more components of the BS 105 configure the UEs 115 to communicate in accordance with the sidelink communication or resource allocation Mode 2, one or more components of the BS 105 may allocate a set of resources (such as a resource pool) for the UEs 115 and the UEs 115 may autonomously schedule sidelink communication using resources from the set of resources (for example, without receiving scheduling information from one or more components of the BS 105).

In some deployment scenarios (such as in deployment scenarios in which one or more of the UEs 115 are OoC of one or more components of a BS 105 and in which one or more components of the BS 105 configures the UEs 115 for sidelink communication or resource allocation Mode 2), communication between the UEs 115 may rely on distributed coordination among the UEs 115 (for example, the sidelink nodes). For example, the UEs 115 may share a common resource pool for SL communication and each UE 115 may identify or select candidate resources within the common resource pool by channel sensing and exclusion.

For example, a UE 115 may select a resource for communication among the candidate resources and may transmit, to one or more other UEs 115, reservation information indicating that the UE 115 has reserved the selected resource. The one or more other UEs 115 may receive the reservation information, identify the reserved resource, and exclude the resource from its own resource selection accordingly.

For sidelink communication in accordance with the sidelink communication or resource allocation Mode 2 (according to which one or more components of a BS 105 refrain from providing scheduling information or controlling communication between the UEs 115), reference signal transmissions may be aperiodic. In other words, due to the distributed nature of a Mode 2 resource allocation, a UE 115 may transmit a reference signal as a result of or responsive to receiving a request for the reference signal. For example, a UE 115 may receive a message (such as a CSI-request field in SCI-2) triggering a sidelink CSI-RS measurement report. In such examples in which the UE 115 (a designated receiver) receives a CSI-request field in SCI, the UE 115 may receive a CSI-RS along with (such as multiplexed with) data, measure the CSI-RS, and transmit a sidelink CSI-RS measurement report responsive to receiving the CSI-request field and using the CSI-RS measurement. Similarly, a UE 115 may transmit a PRS (an SL-PRS 210) as a result of receiving a request for the PRS from another UE 115. Such a request-based procedure for transmission of SL-PRSs 210 may result in SL-PRSs 210 being sent aperiodically or semi-persistently. For example, the signaling diagram 200 may support on-demand SL-PRS 210 such that a UE 115 may transmit an SL-PRS request to one or more other UEs 115 or one or more other devices, such as RSUs. A UE 115 transmitting the SL-PRS request may transmit a request via SCI (such as one or both of SCI-1 or SCI-2) or via a MAC-CE. A UE 115 transmitting an SL-PRS request may transmit the request via unicast signaling, broadcast signaling, or multicast signaling. Responsive to receiving an SL-PRS request, a UE 115 may transmit an SL-PRS 210 with a staggered comb pattern during a portion of a TTI (such as a slot) and, in some implementations, the TTI may be associated with a slot format that is dedicated for SL-PRS transmissions.

In some implementations, a UE 115 (which may be an example of or function as a sidelink anchor node) may transmit an SL-PRS 210 following sensing and resource selection procedures, which may implement one or more aspects of such techniques for transmitting other sidelink resource allocation Mode 2 transmissions. To reserve resources for the SL-PRS 210, the UE 115 may perform one or more of various resource reservation or pre-emption techniques to obtain sufficient resources for the transmission of the SL-PRS 210. For example, a positioning resolution may be associated with (such as correlated with) a sub-channel allocation for an SL-PRS slot during which the UE 115 transmits the SL-PRS, where a greater bandwidth for the SL-PRS 210 may provide higher resolution positioning or ranging information and, accordingly, a full bandwidth of the allocated resource pool may provide receiving UEs 115 with an upper limit or highest resolution.

In some implementations, to reserve a relatively large sub-channel allocation for the SL-PRS slot, UEs 115 may support a priority ranking for different types of sidelink transmissions, and an SL-PRS slot (or the SL-PRS 210) may have a relatively high priority that supports an SL-PRS slot preempting other transmissions in the same slot. As such, the UE 115 may transmit the SL-PRS 210 using the SL-PRS slot and over the full bandwidth of the resource pool (as other transmissions that overlap in time with the SL-PRS slot may be pre-empted by the SL-PRS 210). Additionally, or alternatively, SCI (such as a first SCI-1) associated with (such as scheduling) an SL-PRS transmission may reserve resources for the SL-PRS 210 in any one or more of a current slot (the slot during which the UE 115 transmits the reserving SCI-1) or one or more future slots. In such implementations in which the UE 115 reserves resources for the SL-PRS 210 via SCI (such as SCI-1), the UE 115 may reserve resources in the current slot or in the one or more future slots in a same sub-channel, in different sub-channels, or in another resource pool (such as another resource pool that is frequency division multiplexed with the resource pool allocated for the UE 115). In other words, the SCI may assign resources for SL-PRS transmissions in a same sub-channel, in different sub-channels, or in another frequency division multiplexed resource pool. In implementations in which the UE 115 performs SL-PRS transmissions in different sub-channels or in another resource pool, the UE 115 may perform the SL-PRS transmissions such that phase continuity is maintained across the transmissions. Further, a receiving UE 115 that receives SL-PRS transmissions over different sub-channels or in other frequency division multiplexed resource pools may combine (for example, stitch together) the multiple SL-PRS transmissions into a wideband SL-PRS 210 (and thus may achieve a higher resolution).

In some implementations, the UE 115 may perform the SL-PRS transmissions over a same slot (such that the SL-PRS slots are simultaneous) or within a configured duration (for example, a relatively short duration) and may transmit the SL-PRS 210 in different sub-channels or over multiple frequency division multiplexed resource pools. The UE 115, if performing SL-PRS transmissions across multiple frequency division multiplexed resource pools, may perform the SL-PRS transmissions such that there is phase coherence across the multiple frequency division multiplexed transmissions. Additionally, or alternatively, the UE 115 may use resources at the edge of the allocated resource pool to transmit the SL-PRS 210. For example, there may be residual (unoccupied) resources at the edge of the resource pool and the UE 115 may, in addition or as an alternative to using other resources, may use such residual resources for SL-PRS transmissions. Further, although described in the context of aperiodic SL-PRS transmissions, the UE 115 may alternatively perform SL-PRS transmissions periodically or semi-persistently and may use a periodic resource reservation to reserve resources for such periodic or semi-persistent SL-PRS transmissions.

Additionally, or alternatively, the UE 115 may use resources that are dedicated for SL-PRS transmissions. Such dedicated resources may include a resource pool, a set of sub-channels, or a set of slots, or any combination thereof, and the UE 115 may receive an indication (such as a configuration) of the dedicated resources from one or more components of a BS 105, or the UE 115 may be pre-configured with the dedicated resources (such that the dedicated resources are pre-loaded at the UE 115 and, in some implementations, defined by a specification). In some implementations in which the UE 115 uses resources for SL-PRS transmissions from the resources that are dedicated for SL-PRS transmissions, the UE 115 may transmit one or more SL-PRSs 210 without sensing or reservation. Additionally, or alternatively, a UE 115 may receive a configuration of a measurement gap and may transmit or receive SL-PRSs during the measurement gap. Such a measurement gap may include or otherwise refer to a time duration (for example, a configured duration, a configured periodic interval) during which the UE 115 expects to transmit or receive SL-PRSs and during which the UE 115 does not expect to transmit or receive other sidelink channels, such as a PSSCH.

The UE 115 may transmit the SL-PRS 210 via different cast types for different uses. For example, the UE 115 may transmit the SL-PRS 210 via unicast signaling (for P2P ranging) or may transmit the SL-PRS 210 via multicast signaling or broadcast signaling (for group positioning or sensing). In some implementations, the UE 115 may transmit the SL-PRS 210 via a dedicated cast type that is exclusively used for SL-PRS transmissions. Such a dedicated cast type may be referred to as 'positioning broadcast' and, accordingly, the UE 115 may transmit the SL-PRS 210 via positioning broadcast signaling.

Figure 3:
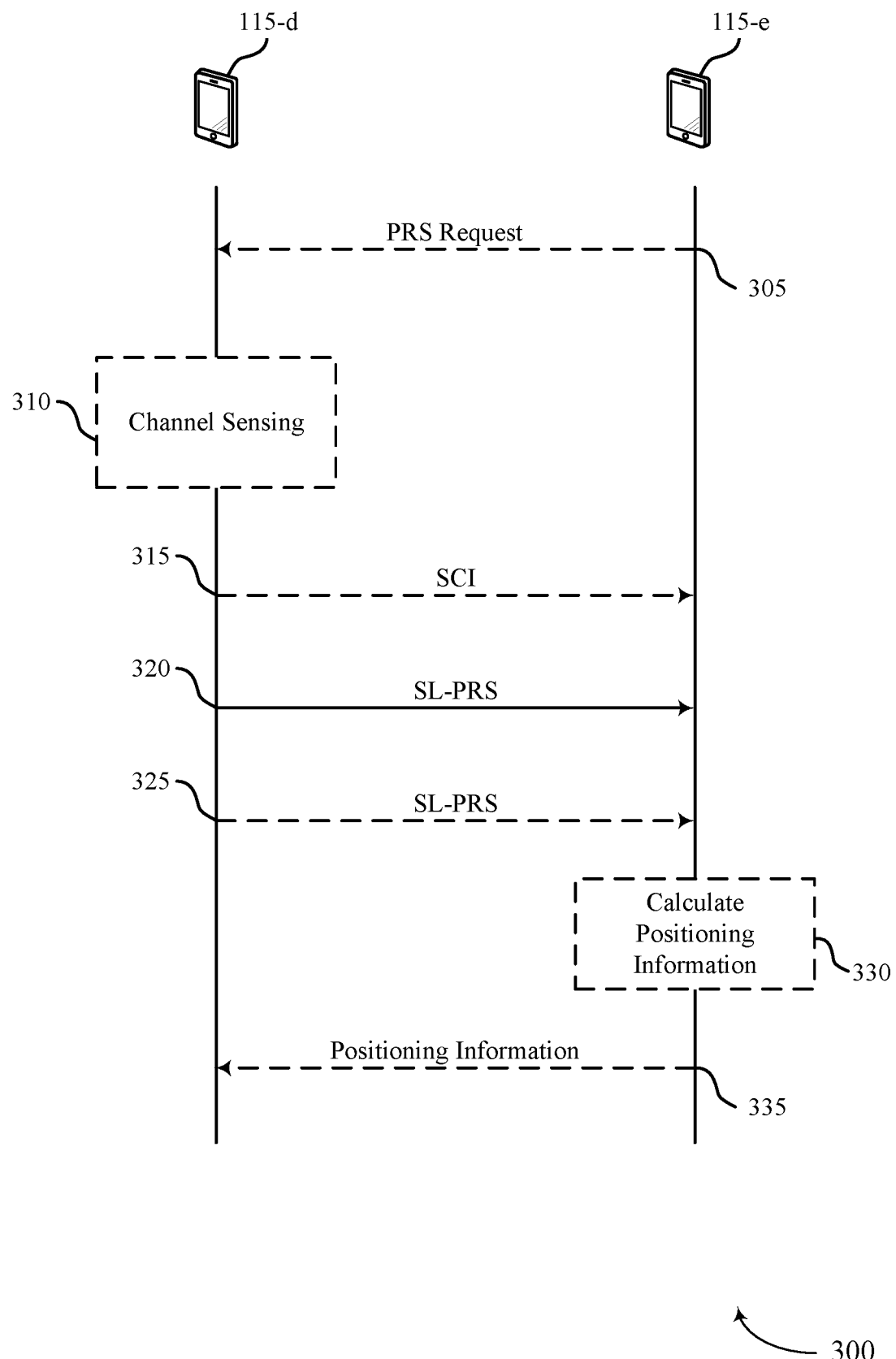
FIGS. 3 and 4 illustrate example process flows that support techniques for sidelink sensing and positioning.

FIG. 3 illustrates an example process flow 300 that supports techniques for sidelink sensing and positioning. The process flow 300 may implement or be implemented to realize aspects of the wireless communications system 100 or the signaling diagram 200. For example, the process flow 300 may illustrate communication between a UE 115-*d* and a UE 115-*e* and, in some implementations, the UE 115-*d* and the UE 115-*e* may be examples of UEs 115 as described with reference to FIGS. 1 and 2. In some implementations, the UE 115-*d* may transmit an SL-PRS to the UE 115-*e* in accordance with a slot format that is dedicated for SL-PRS transmissions.

In the following description of the process flow 300, the operations may be performed (such as reported or provided) in a different order than the order shown, or the operations performed by the example devices may be performed in different orders or at different times. Some operations also may be left out of the process flow 300, or other operations may be added to the process flow 300. Further, although some operations or signaling may be shown to occur at different times for discussion purposes, these operations may actually occur at the same time.

At 305, the UE 115-*e* may, in some implementations, transmit an SL-PRS request to the UE 115-*d*. The UE 115-*e* may transmit the PRS request to the UE 115-*d* to trigger an SL-PRS transmission from the UE 115-*d*. The UE 115-*e* may transmit the SL-PRS request to the UE 115-*d* via SCI, such as one or both of SCI-1 or SCI-2, or via other signaling, such as via a MAC-CE. The SL-PRS request may request the SL-PRS transmission from the UE 115-*d* to request or trigger the UE 115-*d* to transmit the SL-PRS aperiodically, semi-persistently, or periodically. In some implementations, the UE 115-*e* may transmit such a request for on-demand positioning techniques or SL-PRS transmission.

At 310, the UE 115-*d* may, in some implementations, perform a channel sensing procedure, which may be associated with resources allocated for selection by wireless devices (such as UEs 115) for performing sidelink communications. For example, the UE 115-*d* and the UE 115-*e* may receive, from another UE 115 or from a network entity (such as one or more components of a BS 105), control information or configuration information indicating a resource pool in accordance with a sidelink resource allocation Mode 2, or other resource allocation associated with distributed coordination, and the UE 115-*d* may sense resources of the resource pool to identify resources that are available (for example, unoccupied) for the transmission of the requested SL-PRS.

At 315, the UE 115-*d* may, in some implementations, transmit SCI associated with (for example, scheduling or identifying) the SL-PRS. In some implementations, the UE 115-*d* may transmit an indication of a resource to be used for the transmission of the SL-PRS via the SCI. In such implementations, the UE 115-*d* may reserve the resource for a single transmission instance (for aperiodic SL-PRS transmissions), may reserve the resource semi-persistently, or may reserve the resource periodically. Additionally, or alternatively, the UE 115-*d* may reserve resources across multiple slots (such as a current slot, or one or more future slots, or any combination thereof) and across different sub-channels or in different resource pools (such as different frequency division multiplexed resource pools). In some implementations, the UE 115-*d* may transmit an indication of one or both of a slot format for the SL-PRS slot (the slot including the SL-PRS) or an SL-PRS pattern for the transmission of the SL-PRS via the SCI. In some implementations, the UE 115-*d* may transmit an indication of a position of the UE 115-*d*, a timing (such as a time stamp) of the transmission of the SL-PRS, an indication of a resource to be used for a responsive SL-PRS or other responsive transmission, an indication of an SL-PRS pattern for a responsive SL-PRS, or an indication of a transmission power for the SL-PRS, or any combination thereof, via the SCI. The SCI may include one or both of SCI-1 or SCI-2.

At 320, the UE 115-*d* may transmit the SL-PRS in accordance with a TTI associated with the resources allocated for selection by wireless devices (such as UEs 115) for performing sidelink communications. In some implementations, the TTI may include a slot format that is dedicated or exclusively used for SL-PRS transmissions. Such a dedicated slot format may include a PSCCH portion, an SCI-2 portion, one or more DMRS portions, an SL-PRS burst portion, and one or more gap durations adjacent to the SL-PRS burst portion, and may omit or exclude a data portion (for example, may omit or exclude a PSSCH portion). As such, the UE 115-*d* may transmit the SL-PRS during the SL-PRS burst portion of the slot format. In some implementations, the UE 115-*d* may transmit the SL-PRS during the SL-PRS burst portion using a first transmit power that is different than a second transmit power used for a transmission in accordance with another portion of the slot (such as for a transmission using the PSCCH portion, the SCI-2 portion, or the one or more DMRS portions). In some implementations, the UE 115-*d* may transmit the SL-PRS using the resources that the UE 115-*d* sensed to be available or unoccupied at 310. Additionally, or alternatively, the UE 115-*d* may transmit the SL-PRS using resources that are dedicated in the time domain or frequency domain for SL-PRS transmissions, such as resources in an indicated or configured measurement gap duration, or resources in an indicated or configured portion of a frequency spectrum that is dedicated for PRS transmission.

At 325, the UE 115-*d* may, in some implementations, transmit one or more additional SL-PRSs, such as a second SL-PRS. The UE 115-*d* may transmit a second SL-PRS using a same sub-channel, a different sub-channel, or a different resource pool than the UE 115-*d* used for the SL-PRS transmitted at 320. In some implementations, the UE 115-*d* may transmit a second SL-PRS such that SL-PRS transmissions from the UE 115-*d* (across any quantity of sub-channels or resource pools) have phase continuity or phase coherence with each other.

At 330, the UE 115-*e* may, in some implementations, calculate positioning information based at least in part on the SL-PRS of 320, the SL-PRS of 325, or both, where such positioning information may include an absolute position of the UE 115-*e*, or a position, distance, or orientation of the UE 115-*e* relative to the UE 115-*d*, among other positioning information. In some implementations, for example, calculating such other positioning information may include obtaining or calculating environmental sensing information, including an absolute or relative position of a device-free (passive) object. In some implementations, the UE 115-*e* may perform an observed time difference of arrival (OT-DOA)-based positioning method according to which the UE 115-*e* may calculate a range or pseudo-range from the UE 115-*d*, which may operate as or be otherwise considered a sidelink anchor node. In some implementations, each SL-PRS slot may include (for example, in SCI) a time stamp indicating the transmission timing of the SL-PRS sent during that SL-PRS slot. For example, sidelink anchor nodes, such as the UE 115-*d*, may have global or absolute time information (which they may obtain from a GNSS) and, in some implementations, one or multiple sidelink anchor nodes may be synchronized with the global or absolute time. In some deployment scenarios, the UE 115-*e* may lack knowledge of the global or absolute time and, as a result, may calculate a pseudo-range, or an approximation of the range or distance between the UE 115-*e* and the UE 115-*d*, using the time stamp of the SL-PRS slot and a time at which the UE 115-*e* receives the SL-PRS. In some implementations, the UE 115-*e* may perform multiple pseudo-range measurements from different sidelink anchor nodes and the UE 115-*e* may derive its position as well as the global or absolute time using the multiple pseudo-range measurements. For example, for OTDOA-based positioning, the UE 115-*e* may obtain or calculate differences between pairs of pseudo-ranges and may use such differences for positioning. In some aspects, such differences may be referred to as OTDOA values. In some implementations, the UE 115-*e* may refrain from performing hypothesis testing for timing information as a result of receiving a timing (such as a time stamp) of the transmission of the SL-PRS in SCI.

At 335, the UE 115-*e* may, in some implementations, transmit an indication of the determined positioning information to the UE 115-*d*. For example, the UE 115-*e* may transmit an indication of the position or distance of the UE 115-*e* relative to the UE 115-*d*, as calculated via the OTDOA-based positioning method at 330, to the UE 115-*d*. In some implementations, such UE-based positioning in sidelink may correspond to UE-based positioning in Uu. Additionally, or alternatively, the UE 115-*e* may report the measured pseudo-ranges or OTDOA values (such as the differences of pseudo-ranges) to the UE 115-*d* such that the UE 115-*d* may calculate the position of the UE 115-*e*. In some implementations, such UE-assisted positioning in sidelink may correspond to UE-assisted positioning in Uu. As such, the UE 115-*d* may obtain knowledge of the distance or range between the UE 115-*d* and the UE 115-*e* and, in some implementations, may perform one or more operations or actions (such as operations or actions to perform a task or avoid a collision) in accordance with the distance or range.

Figure 4:
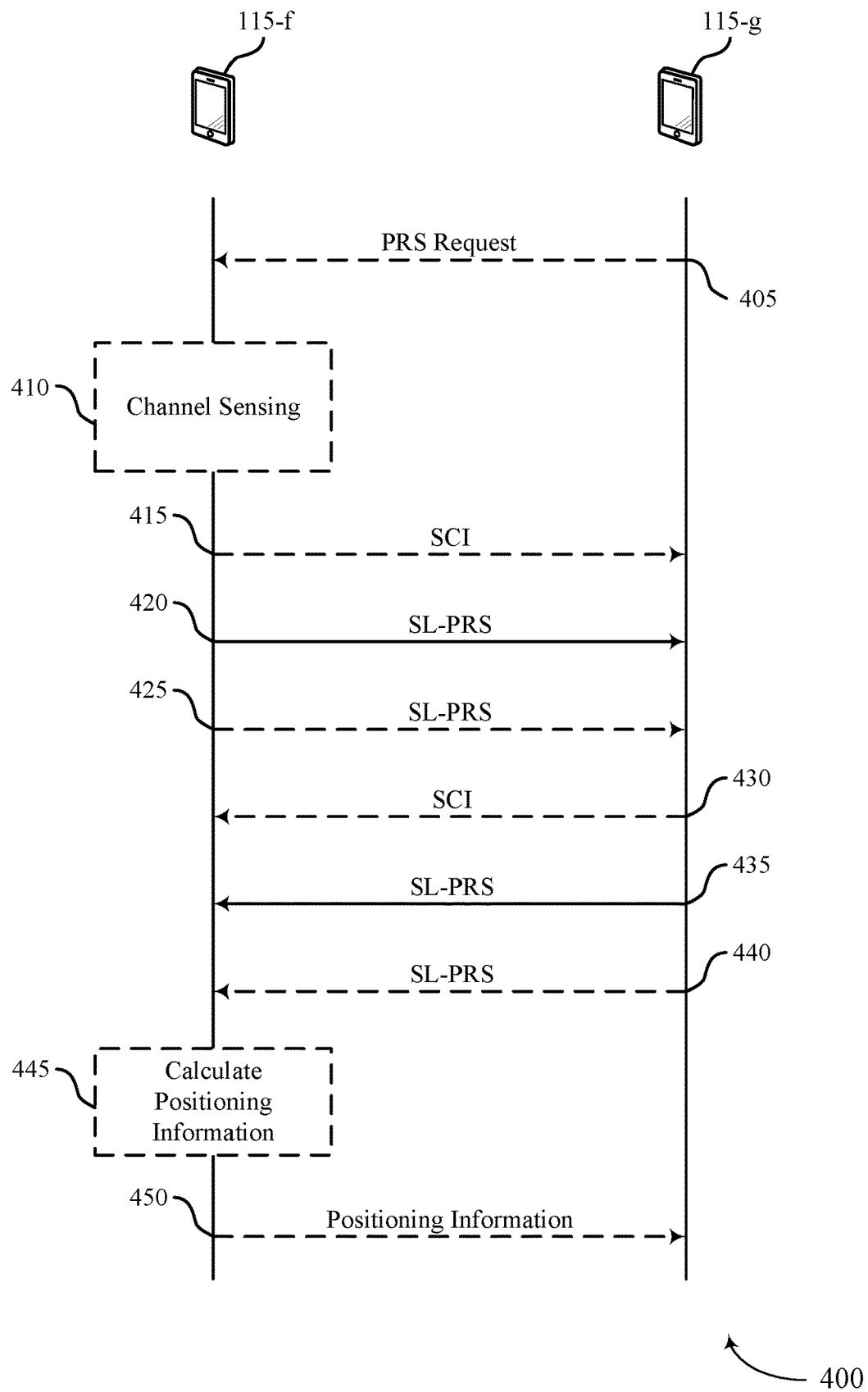

FIG. 4 illustrates an example process flow 400 that supports techniques for sidelink sensing and positioning. The process flow 400 may implement or be implemented to realize aspects of the wireless communications system 100 or the signaling diagram 200. For example, the process flow 400 may illustrate communication between a UE 115-*f* and a UE 115-*g* some implementations, the UE 115-*f* and the UE 115-*g* may be examples of UEs 115 described with reference to FIGS. 1-3. In some implementations, the UE 115-*f* may transmit one or more first SL-PRSs to the UE 115-*g* in accordance with a slot format that is dedicated for SL-PRS transmissions and the UE 115-*g* may transmit one or more second SL-PRSs (for example, responsive PRSs) to the UE 115-*f* in accordance with the slot format that is dedicated for SL-PRS transmissions and responsive to the first SL-PRS.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the UE 115-*g* may, in some implementations, transmit an SL-PRS request to the UE 115-*f* The UE 115-*g* may transmit the PRS request to the UE 115-*f* to trigger an SL-PRS transmission from the UE 115-*f* The UE 115-*g* may transmit the SL-PRS request to the UE 115-*f* via SCI, such as one or both of SCI-1 or SCI-2, or via other signaling, such as via a MAC-CE. The SL-PRS request may request the SL-PRS transmission from the UE 115-*f* to request or trigger the UE 115-*f* to transmit the SL-PRS aperiodically, semi-persistently, or periodically. In some implementations, the UE 115-*g* may transmit such a request for on-demand positioning techniques or SL-PRS transmission.

At 410, the UE 115-*f* may, in some implementations, perform a channel sensing procedure, which may be associated with resources allocated for selection by wireless devices (such as UEs 115) for performing sidelink communications. For example, the UE 115-*f* and the UE 115-*g* may receive, from another UE 115 or from a network entity (such as one or more components of a BS 105), control information or other configuration information indicating a resource pool in accordance with a sidelink resource allocation Mode 2, or other resource allocation associated with distributed coordination, and the UE 115-*f* may sense resources of the resource pool to identify resources that are available (for example, unoccupied) for the transmission of the requested SL-PRS.

At 415, the UE 115-*f* may, in some implementations, transmit SCI associated with (for example, scheduling or identifying) the SL-PRS. In some implementations, the UE 115-*f* may transmit an indication of a resource to be used for the transmission of the SL-PRS via the SCI. In such implementations, the UE 115-*f* may reserve the resource for a single transmission instance (for aperiodic SL-PRS transmissions), may reserve the resource semi-persistently, or may reserve the resource periodically. Additionally, or alternatively, the UE 115-*f* may reserve resources across multiple slots (such as a current slot or one or more future slots, or any combination thereof) and across different sub-channels or in different resource pools (such as different frequency division multiplexed resource pools). In some implementations, the UE 115-*f* may transmit an indication of one or both of a slot format for the SL-PRS slot (the slot including the SL-PRS) or an SL-PRS pattern for the transmission of the SL-PRS via the SCI. In some implementations, the UE 115-*f* may transmit an indication of a position of the UE 115-*f*, a timing (such as a time stamp) of the transmission of the SL-PRS, an indication of a resource (such as a reserved resource or one or more candidate transmission timings or occasions) to be used for a responsive SL-PRS or other responsive transmission, an indication of an SL-PRS pattern for a responsive SL-PRS, or an indication of a transmission power for the SL-PRS, or any combination thereof, via the SCI. The SCI may include one or both of SCI-1 or SCI-2.

At 420, the UE 115-*f* may transmit the SL-PRS in accordance with a TTI associated with the resources allocated for selection by wireless devices (such as UEs 115) for performing sidelink communications. In some implementations, the TTI may include a slot format that is dedicated or exclusively used for SL-PRS transmissions. Such a dedicated slot format may include a PSCCH portion, an SCI-2 portion, one or more DMRS portions, an SL-PRS burst portion, and one or more gap durations adjacent to the SL-PRS burst portion, and may omit or exclude a data portion (for example, may omit or exclude a PSSCH portion). As such, the UE 115-$f$ may transmit the SL-PRS during the SL-PRS burst portion of the slot format. In some implementations, the UE 115-$f$ may transmit the SL-PRS during the SL-PRS burst portion using a first transmit power that is different than a second transmit power used for a transmission in accordance with another portion of the slot format (such as for a transmission using the PSCCH portion, the SCI-2 portion, or the one or more DMRS portions). In some implementations, the UE 115-$f$ may transmit the SL-PRS using the resources that the UE 115-$f$ sensed to be available at 410. Additionally, or alternatively, the UE 115-$f$ may transmit the SL-PRS using resources that are dedicated in the time domain or frequency domain for SL-PRS transmissions, such as resources in an indicated or configured measurement gap duration, or resources in an indicated or configured portion of a frequency spectrum that is dedicated for PRS transmission.

At 425, the UE 115-$f$ may, in some implementations, transmit one or more additional SL-PRSs, such as a second SL-PRS. The UE 115-$f$ may transmit a second SL-PRS using a same sub-channel, a different sub-channel, or a different resource pool than the UE 115-$f$ used for the SL-PRS transmitted at 420. In some implementations, the UE 115-$f$ may transmit a second SL-PRS such that SL-PRS transmissions from the UE 115-$f$ (across any quantity of sub-channels or resource pools) have phase continuity or phase coherence with each other.

The UE 115-$g$ may receive the SL-PRS at 420 and, in some implementations, the second SL-PRS at 425 and, in some deployment scenarios, may transmit an SL-PRS to the UE 115-$f$ responsive to the SL-PRS transmissions from the UE 115-$g$. In other words, the UE 115-$g$ may receive the SL-PRS transmissions from the UE 115-$f$ preceding SL-PRS transmissions from the UE 115-$g$ and the SL-PRS transmissions from the UE 115-$g$ may be associated with (for example, triggered by) the receiving of the SL-PRS transmissions from the UE 115-$f$. In some implementations, the UE 115-$g$ may receive the SL-PRS and, in some implementations, may report, to a third wireless device (such as another UE 115 or a network entity), an indication of a timing or other positioning information associated with the receiving of the SL-PRS from the UE 115-$f$.

At 430, the UE 115-$g$ may, in some implementations, transmit SCI associated with (for example, scheduling or identifying) the SL-PRS transmission from the UE 115-$g$. In some implementations, the UE 115-$g$ may transmit an indication of a resource to be used for the transmission of the SL-PRS via the SCI. In some implementations, the UE 115-$g$ may use the resource indicated by the SCI received at 415 (indicating a resource for a responsive SL-PRS). In some implementations, the UE 115-$g$ may reserve resources across multiple slots (such as a current slot or one or more future slots, or any combination thereof) and across different sub-channels or in different resource pools (such as different frequency division multiplexed resource pools). In some implementations, the UE 115-$g$ may transmit an indication of one or both of a slot format for the SL-PRS slot (the slot including the SL-PRS) or an SL-PRS pattern for the transmission of the SL-PRS via the SCI. In some implementations, the UE 115-$g$ may transmit an indication of a position of the UE 115-$g$, a timing (such as a time stamp) of the transmission of the SL-PRS, or an indication of a transmission power for the SL-PRS, or any combination thereof, via the SCI. The SCI may include one or both of SCI-1 or SCI-2.

At 435, the UE 115-$g$ may transmit the SL-PRS in accordance with a TTI associated with the resources allocated for selection by wireless devices (such as UEs 115) for performing sidelink communications. In some implementations, the TTI may include a slot format that is dedicated or exclusively used for SL-PRS transmissions. Such a dedicated slot format may include a PSCCH portion, an SCI-2 portion, one or more DMRS portions, an SL-PRS burst portion, and one or more gap durations adjacent to the SL-PRS burst portion, and may omit or exclude a data portion (for example, may omit or exclude a PSSCH portion). In some implementations, the slot format used by the UE 115-$g$ for the transmission of the SL-PRS at 435 may be the same as the slot format used by the UE 115-$f$ for the transmission of the SL-PRSs at one or both of 420 or 425. As such, the UE 115-$g$ may transmit the SL-PRS during the SL-PRS burst portion of the slot format. In some implementations, the UE 115-$g$ may transmit the SL-PRS during the SL-PRS burst portion using a first transmit power that is different than a second transmit power used for a transmission in accordance with another portion of the slot format (such as for a transmission using the PSCCH portion, the SCI-2 portion, or the one or more DMRS portions). In some implementations, the UE 115-$g$ may transmit the SL-PRS using the resource indicated by the SCI received at 415 (indicating a resource for a responsive SL-PRS). In some implementations, the UE 115-$g$ may transmit the SL-PRS using a resource that the UE 115-$f$ sensed to be available at 410, and indicated to the UE 115-$g$, over which the UE 115-$g$ may or may not perform an additional channel sensing to evaluate the continued availability of such indicated resources. In some implementations, the UE 115-$g$ may transmit the SL-PRS using resources that are dedicated for SL-PRS transmissions. In implementations in which the UE 115-$g$ uses a resource that the UE 115-$g$ senses to be available, the UE 115-$g$ may sense one or more candidate transmission timings or occasions.

At 440, the UE 115-$g$ may, in some implementations, transmit one or more additional PRSs, such as a second SL-PRS. The UE 115-$g$ may transmit a second SL-PRS using a same sub-channel, a different sub-channel, or a different resource pool than the UE 115-$g$ uses for the SL-PRS transmitted at 435. In some implementations, the UE 115-$g$ may transmit a second SL-PRS such that SL-PRS transmissions from the UE 115-$g$ (across any quantity of sub-channels or resource pools) have phase continuity or phase coherence with each other.

At 445, the UE 115-$f$ may, in some implementations, calculate positioning information based at least in part on the transmission of the SL-PRS at 420, or 425, or both, and the reception of the SL-PRS at 435, or at 440, or both, where such positioning information may include an absolute position of the UE 115-$f$ or UE 115-$g$, or a position, distance, or orientation of the UE 115-$f$ relative to the UE 115-$g$, among other positioning information. For example, the UE 115-$f$ may perform a round-trip-time (RTT)-based positioning method according to which the UE 115-$f$ may calculate a distance or range between the UE 115-$f$ and the UE 115-$g$ using the RTT associated with the SL-PRS transmissions from the UE 115-$f$ and the UE 115-$g$. For example, and as shown and described with reference to the process flow 400, upon receiving a first SL-PRS from the UE 115-*f* (which may function as a sidelink anchor node), the UE 115-*g* may transmit a second SL-PRS in response. In some implementations, the UE 115-*f* may refrain from performing hypothesis testing for timing information as a result of receiving a timing (such as a time stamp) of the transmission of the SL-PRS in SCI.

In some implementations, a resource for responsive SL-PRS transmissions may be indicated by or reserved by SCI in a first SL-PRS slot, such as the SCI transmitted by the UE 115-*f* at 415. In some other implementations, the UE 115-*g* may select a resource for the second SL-PRS (the SL-PRS transmitted by the UE 115-*g* at 435), which may be performed in accordance with sidelink resource allocation Mode 2 procedures. For example, the UE 115-*g* may select from a set of candidate transmission occasions or timings and may transmit the SL-PRS using one or more of the set of candidate transmission occasions or timings (for example, such that the UE 115-*g* transmits the SL-PRS at an occasion or timing associated with a successful selection or reservation of resources in accordance with sidelink resource allocation Mode 2 procedures). In such examples, the UE 115-*f* may perform hypothesis testing among the candidate transmission occasions or timings, may obtain, calculate, or otherwise determine a (true or accurate) round trip delay as a result of the hypothesis testing, and may obtain, calculate, or otherwise determine the position or distance between the UE 115-*g* and the UE 115-*f* using the round trip delay.

At 450, the UE 115-*f* may, in some implementations, transmit an indication of the determined positioning information (for example, of the UE 115-*g* or of the UE 115-*f*) to the UE 115-*g*. For example, the UE 115-*f* may transmit an indication of the position or distance of the UE 115-*f* relative to the UE 115-*g*, as calculated via the RTT-based positioning method at 445, to the UE 115-*g*. Additionally, or alternatively, the UE 115-*f*, alone or together with one or more other UEs 115, may calculate the position of the UE 115-*g* from multiple RTT measurements, and may indicate the calculated position of the UE 115-*g* to the UE 115-*g*. Additionally, or alternatively, the UE 115-*f*, optionally together with other UEs 115, may indicate one or more RTT measurements to the UE 115-*g* and the UE 115-*g* may calculate a relative distance or a position of the UE 115-*g* using the one or more RTT measurements received RTT measurements (such as the received RTT measurements from multiple UEs 115). As such, the UE 115-*g* may obtain knowledge of the distance or range between the UE 115-*f* and the UE 115-*g* and, in some implementations, may perform one or more operations or actions (such as operations or actions to perform a task or avoid a collision) in accordance with the distance or range.

Figure 5:
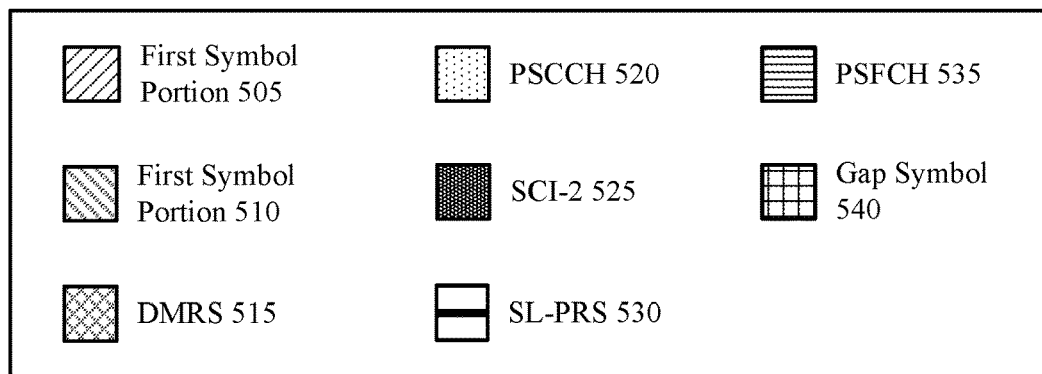
FIG. 5 illustrates example slot formats that support techniques for sidelink sensing and positioning.
Figure 5:
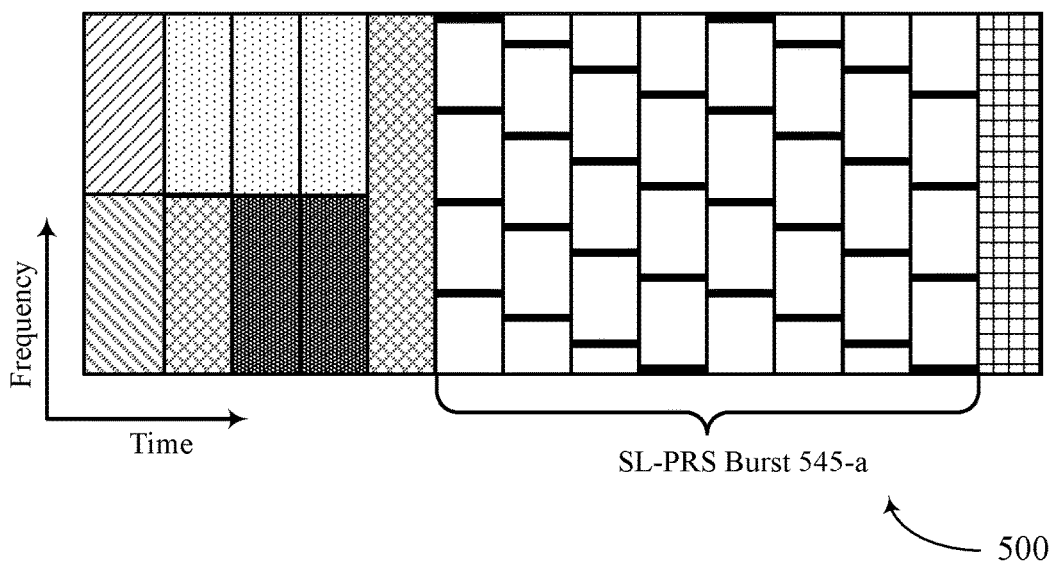
Figure 5:
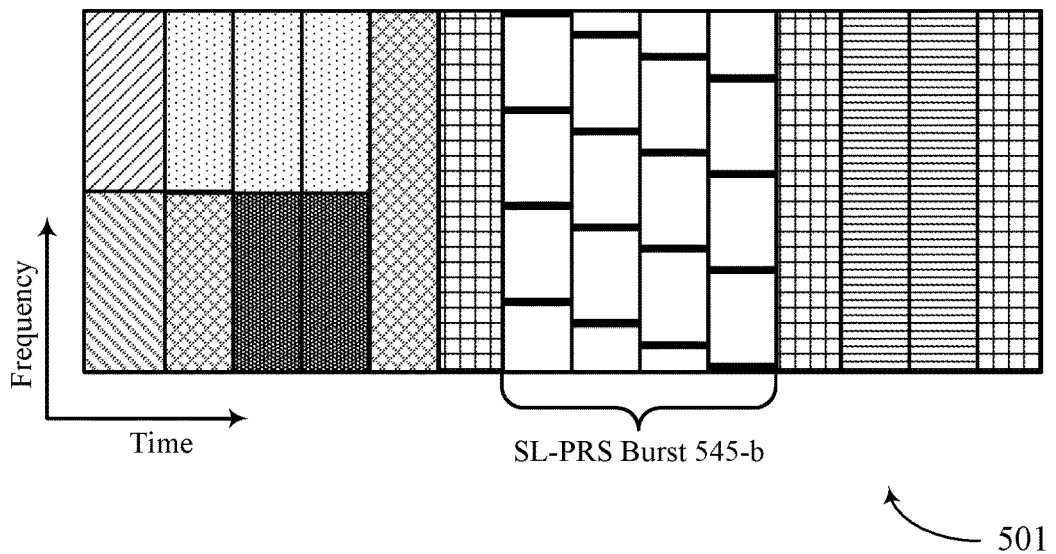

FIG. 5 illustrates example slot formats 500 and 501 that support techniques for sidelink sensing and positioning. The slot formats 500 and 501 may implement or be implemented to realize aspects of the wireless communications system 100 or the signaling diagram 200. For example, one or both of the slot formats 500 or 501 may be an example of a slot format that is dedicated for SL-PRS transmission, and a UE 115 may transmit an SL-PRS 530, or receive an SL-PRS 530, in accordance with the slot format 500 or the slot format 501. In some implementations, such UEs 115 may be examples of UEs 115 as described with reference to FIGS. 1-4.

The slot format 500 may represent a 12-symbol pattern and the slot format 501 may represent a 9-symbol pattern. In some implementations, the slot formats 500 and 501 may be introduced for (such as available for) sidelink communications in addition to other slot formats, but the slot formats 500 and 501 may be dedicated for SL-PRS transmissions. The slot formats 500 and 501 may include a first symbol portion 505 and a first symbol portion 510, one or more DMRSs 515, a PSCCH 520 (carrying SCI-1), SCI-2 525, an SL-PRS burst 545 including the SL-PRS 530, and one or more gap symbols 540. In some implementations, a first symbol portion 505 may be a repetition of a PSCCH 520, and a first symbol portion 510 may be a repetition of a DMRS 515 (for example, in a slot format associated with 14 total symbol durations). As shown in FIG. 5, the slot format 500 may include an SL-PRS burst 545-*a* spanning eight symbols and the slot format 501 may include an SL-PRS burst 545-*b* spanning four symbols. In some implementations, the slot formats 500 and 501 may lack or be absent of a PSSCH (an SL-SCH). For example, instead of including a PSSCH portion, the slot formats 500 and 501 may include a portion dedicated for an SL-PRS burst 545.

The SL-PRS 530, which a UE 115 may transmit during an SL-PRS burst 545 (a set of consecutive symbols), may feature or otherwise be associated with a transmission pattern, such as a staggered comb pattern, where the SL-PRS 530 may be distributed on different subsets of frequency resources in successive symbol durations. In some implementations, the SL-PRS 530 may feature or be associated with a similar structure or pattern as a Uu-PRS. In some implementations, one or both of a candidate slot and the SL-PRS pattern may be configured (for example, pre-configured) at a UE 115 transmitting an SL-PRS 530, or a UE 115 receiving an SL-PRS 530 may receive control signaling (such as SCI-2) indicating one or both of the candidate slot and the SL-PRS pattern.

In some implementations, a UE 115 may use a different transmit power or different timing for SL-PRS slots (slots transmitted in accordance with the slot format 500 or the slot format 501) as compared to other sidelink transmissions. For example, a UE 115 may use a different transmit power for signaling sent during an SL-PRS slot or an SL-PRS slot may span a different amount of time (such as a different quantity of symbols) than other slots, such as slots including a PSSCH portion. In some examples in which the UE 115 uses a different transmit power for signaling sent during an SL-PRS slot, the UE 115 may use a different transmit power control procedure (such as a transmit power control procedure that is dedicated for SL-PRS slots) than another transmit power control procedure used for other signaling (such as for a sidelink slot including a PSSCH). In other words, the UE 115 may use a first transmit power control procedure that is associated with a first target receive power and a first pathloss compensation factor for SL-PRS slots and the UE 115 may use a second transmit power control procedure that is associated with a second target receive power and a second pathloss compensation factor for slots including a PSSCH. In some examples in which the UE 115 uses different timing for SL-PRS slots than for slots including a PSSCH, the UE 115 may use different timing synchronization (associated with a synchronization source) for the different types of slots. For example, for a PSSCH transmission, the UE 115 may use a transmission timing that is relative to timing obtained from a network entity or another sidelink node (via a synchronization signal, such as an SSB), but, for an SL-PRS transmission, the UE 115 may use a transmission timing that is relative to an absolute time obtained from a GNSS.

Additionally, or alternatively, the first UE 115 may transmit the SL-PRS 530 using a different transmit power or different timing than other signaling sent within that SL-PRS slot. For example, a UE 115 may transmit the SL-PRS 530 using a different transmit power or different timing (for example, may define symbol durations differently for an SL-PRS burst 545 than other symbols within the SL-PRS slot) than the UE 115 uses for the first symbol portion 505, the first symbol portion 510, the one or more DMRSs 515, the PSCCH 520, the SCI-2 525, or the PSFCH 535, or any combination thereof. In such examples, the UE 115 may use a slot format (such as the slot format 501) that provides one or more gap symbols 540 during which the UE 115 may adjust one or both of a transmit power or a transmit timing. For example, the slot format 501 may include a gap symbol 540 before an SL-PRS burst 545 and a gap symbol 540 after the SL-PRS burst 545-b and the UE 115 may adjust a transmit power of the UE 115 during those gap symbols 540.

To support the slot formats 500 and 501 and efficient SL-PRS measurement and reporting, the SCI-1 (sent using the PSCCH 520) or the SCI-2 525, or both, may include information specific to SL-PRS transmission, such as one or more fields for positioning assistant data, in addition to other SCI fields. For example, the SCI-1 or the SCI-2 525 associated with the slot formats 500 and 501 may have different formats that are dedicated or specific for SL-PRS slots. For example, a UE 115 may transmit, via one or both of SCI-1 or SCI-2 525, an indication of its position such that SCI-1 or SCI-2 525 includes the position of the transmitter (which may be an example of a sidelink anchor node). In some implementations, instead of a rough position (such as a zone identifier), a UE 115 transmitting an SL-PRS may include a relatively more accurate geographic position (such as a position determined or inferred from GNSS signaling) in SCI. To reduce overhead, the UE 115 may signal the relatively more accurate position at the beginning (at transmission of a temporally first or initial SL-PRS 530) and may signal time-variation (relative to the initially reported position) thereafter.

Additionally, or alternatively, a UE 115 may signal a transmission time stamp (such as an accurate transmission time stamp) via SCI for range or pseudo-range measurement. Additionally, or alternatively, a UE 115 may signal a pattern of the SL-PRS 530 (if more than one pattern is configured, such as via previous SCI, MAC-CE, or RRC signaling) via SCI. In implementations in which a UE 115 signals the pattern of the SL-PRS 530 via SCI, the first UE 115 may dynamically indicate a scrambling sequence associated with an SL-PRS pattern. Additionally, or alternatively, a UE 115 may indicate changes in SL-PRS patterns in accordance with a configured (for example, pre-configured) pattern for resource reuse (for example, such that SL-PRS 530 uses a resource that also may be allocated to another, remote or relatively distant UE 115) or in accordance with interference randomization. In some implementations, a UE 115 also may indicate a pattern of a responding or responsive SL-PRS 530 (for RTT-based sidelink positioning) or a transmit power of the SL-PRS 530 (for signal strength-based, such as reference signal receive power (RSRP)-based, positioning or sensing). In some implementations, some of the positioning data associated with a UE 115 transmitting an SL-PRS may be configured (for example, preconfigured) at one or more receiving UEs 115 and, in such implementations, the transmitting UE 115 may refrain from dynamically indicating such positioning information.

Figure 6:
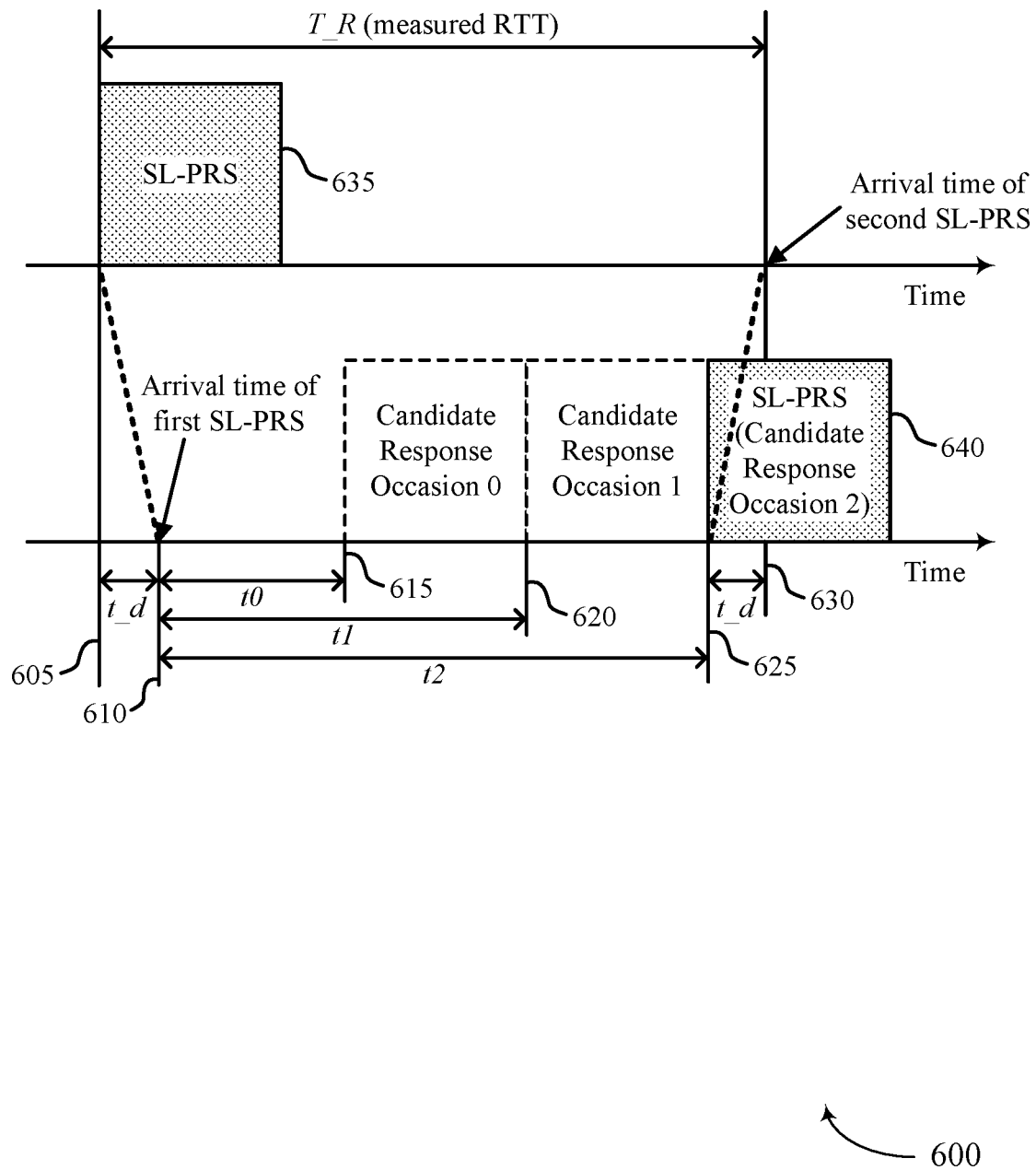
FIG. 6 illustrates an example sidelink positioning technique that supports techniques for sidelink sensing and positioning.

FIG. 6 illustrates an example sidelink positioning technique 600 that supports techniques for sidelink sensing and positioning. The sidelink positioning technique 600 may implement or be implemented to realize aspects of the wireless communications system 100 or the signaling diagram 200. For example, a first UE 115 (which may be an example of a sidelink anchor node) and a second UE 115 may perform one or more aspects of the sidelink positioning technique 600 to obtain sidelink positioning information in accordance with an RTT-based sidelink positioning method. In some implementations, such first and second UEs 115 may be examples of UEs 115 as described with reference to FIGS. 1-5.

In accordance with the sidelink positioning technique 600, a first UE 115 may transmit a first SL-PRS 635 at 605 and a second UE 115 may receive the first SL-PRS 635 at 610 (for example, after a delay time $t_d$). In some implementations, the first UE 115 and the second UE 115 may support or be aware of a quantity of candidate response occasions (for example, three candidate response occasions) for a transmission of a second SL-PRS 640 from the second UE 115 (for example, during which the second UE 115 may transmit responsive to the first SL-PRS 635 in accordance with the sidelink positioning technique 600). The first UE 115 may indicate the candidate response occasions via SCI, or the candidate response occasions may be configured at the second UE 115 (such as being pre-configured, or configured via RRC signaling, for example, from a network entity).

In some implementations, a timing associated with the candidate response occasions (which may include a candidate response occasion 0, a candidate response occasion 1, and a candidate response occasion 2) may be defined with respect to or relative to the reception time of the first SL-PRS 635 (for example, with respect to 610). Each of the candidate response occasions may be associated with a different delay, and each of the delays to the different occasions may be large enough to allow the second UE 115 to process the first SL-PRS 635, sense and exclude a channel for the second SL-PRS 640, and select a resource for the transmission of the second SL-PRS 640 (for operation in accordance with sidelink resource allocation Mode 2). For example, the candidate response occasion 0 may start at 615 and be associated with a delay $t_0$, the candidate response occasion 1 may start at 620 and be associated with a delay $t_1$, and the candidate response occasion 2 may start at 625 and be associated with a delay $t_2$.

As such, the second UE 115 may receive the first SL-PRS 635 and may (responsively) transmit the second SL-PRS 640 using a first or earliest occasion that the second UE 115 selects in accordance with a sidelink resource selection procedure. For example, and as shown in FIG. 6, the second UE 115 may select the candidate response occasion 2 and may transit the second SL-PRS 640 starting at 625. The first UE 115 may receive the second SL-PRS 640 at 630 (for example, after a delay time $t_d$) and may calculate a measured RTT (which may be referred to as $T_R$) associated with the first SL-PRS 635 and the second SL-PRS 640. The first UE 115 may calculate the measured RTT $T_R$ using Equation 1.

$$T_R = 2t_d + \tau, \tau \in \{t_0, t_1, t_2\} \qquad (1)$$

The first UE 115 may use the measured RTT $T_R$ to obtain a range estimate between the first UE 115 and the second UE 115 using Equation 2, where c is equal to the speed of light.

$$d = c \cdot \frac{(T_R - \tau)}{2} \qquad (2)$$

Further, although described in the context of ranging between the two UEs 115 (the first UE 115 and the second UE 115), the first UE 115 may obtain, calculate, or otherwise determine positioning using a collection of multiple range estimates from multiple (such as at least three) UEs 115 (such as sidelink anchor nodes) and performing hypothesis testing for $\tau \in \{t_0, t_1, t_2\}$.

Figure 7:
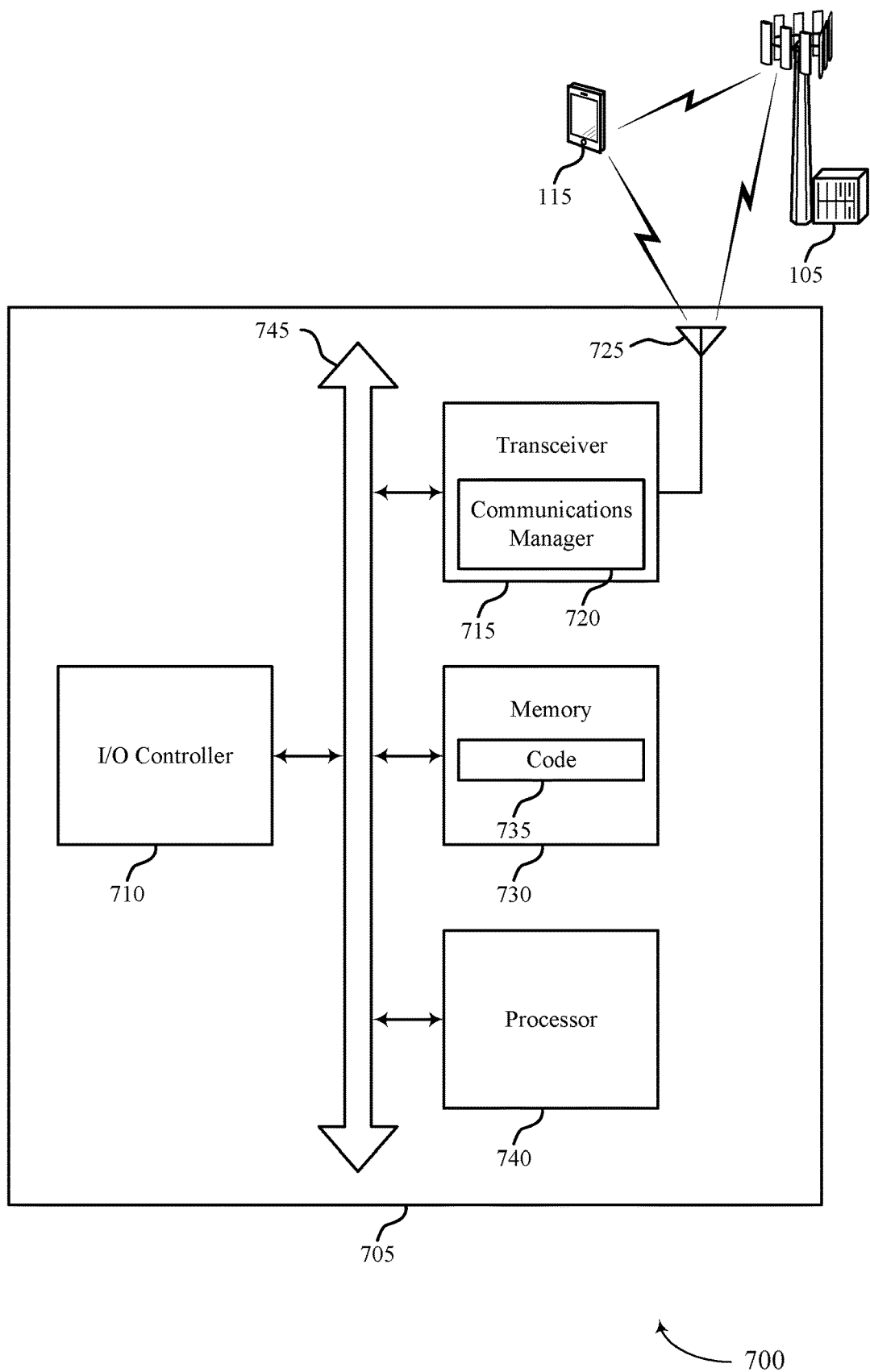
FIG. 7 shows a block diagram of an example device that supports techniques for sidelink sensing and positioning.

FIG. 7 shows a block diagram 700 including an example device 705 that supports techniques for sidelink sensing and positioning. The device 705 may communicate wirelessly with one or more BSs 105 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as operatively, communicatively, functionally, electronically, or electrically) via one or more buses (such as a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725. In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations associated with received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (for example, the processor 740, or the memory 730, or both), may be included in a chip or chip assembly that is installed in the device 705.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (for example, when compiled and executed) to perform functions described herein. In some implementations, the memory 730 may contain, among other things, a basic I/O system (BIOS) which may control basic hardware or software operation such as the interaction with peripheral components or devices.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The communications manager 720 may support wireless communication in accordance with examples as disclosed herein. For example, the communications manager 720 may be configured as or otherwise support a means for receiving, at a wireless device, control information indicating resources allocated for selection by wireless devices for performing sidelink communications (for example, resources associated with a Mode 2 sidelink resource allocation). The communications manager 720 may be configured as or otherwise support a means for transmitting, by the wireless device, a PRS (for example, an SL-PRS) in accordance with a TTI (for example, a TTI configuration or format) associated with the resources allocated for selection by wireless devices for performing sidelink communications.

In some implementations, the communications manager 720 may be configured as or otherwise support a means for receiving, from a second wireless device, a PRS request, where transmitting the PRS is associated with receiving the PRS request.

In some implementations, the communications manager 720 may be configured as or otherwise support a means for receiving, from a second wireless device, a second PRS in response to transmitting the PRS.

In some implementations, the communications manager 720 may be configured as or otherwise support a means for transmitting an indication of a position or a distance of the second wireless device calculated in accordance with an RTT associated with the transmitting of the PRS and the receiving of the second PRS.

In some implementations, the communications manager 720 may be configured as or otherwise support a means for transmitting, via SCI associated with the TTI, an indication of a resource to be used for transmission of the second PRS. In some implementations, the communications manager 720 may be configured as or otherwise support a means for receiving the second PRS using the indicated resource.

In some implementations, the communications manager 720 may be configured as or otherwise support a means for receiving, from a second wireless device, a second PRS preceding the transmitting of the PRS, where transmitting the PRS is associated with receiving the second PRS.

In some implementations, the communications manager 720 may be configured as or otherwise support a means for receiving, via SCI associated with the second PRS, an indication of a resource to be used for the transmission of the PRS. In some implementations, the communications manager 720 may be configured as or otherwise support a means for transmitting the PRS using the indicated resource.

In some implementations, the communications manager 720 may be configured as or otherwise support a means for performing a channel sensing procedure associated with one or more candidate transmission occasions as a result of receiving the second PRS. In some implementations, the communications manager 720 may be configured as or otherwise support a means for transmitting the PRS using an available transmission occasion, of the one or more candidate transmission occasions, identified as a result of the channel sensing procedure.

In some implementations, the TTI includes a slot format that is dedicated for sidelink PRS transmission.

In some implementations, the slot format includes a PSCCH portion, a second stage SCI portion, one or more DMRS portions, a PRS burst portion, and one or more gap durations adjacent to the PRS burst portion. In some implementations, the slot format may exclude a data portion (for example, exclude a PSSCH portion).

In some implementations, the communications manager 720 may be configured as or otherwise support a means for transmitting control signaling indicating one or both of the slot format or a PRS pattern for the transmission of the PRS. In some implementations, the communications manager 720 may be configured as or otherwise support a means for transmitting the PRS during the PRS burst portion and using one or both of the slot format or the PRS pattern.

In some implementations, to support transmitting the PRS, the communications manager 725 may be configured as or otherwise support a means for transmitting the PRS during the PRS burst portion using a first transmit power that is different than a second transmit power used for a transmission in accordance with another portion of the slot format.

In some implementations, the communications manager 720 may be configured as or otherwise support a means for transmitting, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

In some implementations, the communications manager 720 may be configured as or otherwise support a means for transmitting an indication of SCI reserving a set of periodic resources of the resources allocated to sidelink communications. In some implementations, the communications manager 720 may be configured as or otherwise support a means for transmitting the PRS using the set of periodic resources.

In some implementations, the communications manager 720 may be configured as or otherwise support a means for transmitting, by the wireless device and in accordance with the TTI, a second PRS using a different sub-channel or using a different resource pool than the PRS, the transmission of the second PRS having phase continuity with the transmission of the PRS.

In some implementations, the PRS is transmitted using resources, of the resources allocated for selection by wireless devices for performing sidelink communications, that are dedicated for PRS transmissions.

In some implementations, the communications manager 720 may be configured as or otherwise support a means for performing a channel sensing procedure associated with the resources allocated for selection by wireless devices for performing sidelink communications. In some implementations, the communications manager 720 may be configured as or otherwise support a means for transmitting, in accordance with the TTI and using a set of resources, of the resources allocated for selection by wireless devices for performing sidelink communications, identified as a result of the channel sensing procedure, the PRS and an indication of SCI reserving the set of resources.

Additionally, or alternatively, the communications manager 720 may support wireless communication in accordance with examples as disclosed herein. For example, the communications manager 720 may be configured as or otherwise support a means for receiving, at a first wireless device, control information indicating resources allocated for selection by wireless devices for performing sidelink communications (for example, resources associate with a sidelink Mode 2 resource allocation). The communications manager 720 may be configured as or otherwise support a means for receiving, at the first wireless device from a second wireless device, a PRS (for example, an SL-PRS) using the indicated resources allocated for selection by wireless devices for performing sidelink communications.

In some implementations, the communications manager 720 may be configured as or otherwise support a means for transmitting a PRS request, where receiving the PRS is associated with transmitting the PRS request.

In some implementations, the PRS request includes an indication of SCI, an indication of a MAC-CE, or RRC signaling.

In some implementations, the communications manager 720 may be configured as or otherwise support a means for receiving, via SCI associated with the PRS, an indication of a position of the second wireless device and an indication of a transmission timing of the PRS from the second wireless device, where a position of the first wireless device may be determined using the indicated position of the second wireless device and the indicated transmission timing of the PRS from the second wireless device.

In some implementations, the communications manager 720 may be configured as or otherwise support a means for receiving, via SCI associated with the PRS, an indication of a position of the second wireless device and an indication of a transmission timing of the PRS from the second wireless device. In some implementations, the communications manager 720 may be configured as or otherwise support a means for reporting, to a third wireless device, an indication of a timing associated with receiving the PRS from the second wireless device.

In some implementations, the communications manager 720 may be configured as or otherwise support a means for transmitting a second PRS, where receiving the PRS is associated with transmitting the second PRS.

In some implementations, the communications manager 720 may be configured as or otherwise support a means for transmitting an indication of a position or a distance of the second wireless device calculated in accordance with an RTT associated with the transmitting of the second PRS and the receiving of the PRS.

In some implementations, the communications manager 720 may be configured as or otherwise support a means for transmitting, using sidelink control information associated with the transmitting of the second PRS, an indication reserving a portion of the resources allocated for selection by wireless devices for performing sidelink communication. In some implementations, the communications manager 720 may be configured as or otherwise support a means for receiving the PRS using the reserved portion of the resources allocated for selection by wireless devices for performing sidelink communications.

In some implementations, the communications manager 720 may be configured as or otherwise support a means for receiving, via SCI associated with the PRS, an indication of a slot format dedicated for PRS transmissions. In some implementations, the communications manager 720 may be configured as or otherwise support a means for receiving the PRS in accordance with the indicated slot format.

In some implementations, the slot format includes a PSCCH portion, a second stage SCI portion, one or more DMRS portions, one or more gap durations, and a PRS burst portion. In some implementations, the slot format may exclude a data portion (for example, exclude a PSSCH portion).

In some implementations, the communications manager 720 may be configured as or otherwise support a means for receiving control signaling indicating one or both of the slot format or a PRS pattern for the PRS. In some implementations, the communications manager 725 may be configured as or otherwise support a means for receiving the PRS during the PRS burst portion and using the one or both of the slot format or the PRS pattern.

In some implementations, the communications manager 720 may be configured as or otherwise support a means for receiving, via SCI associated with the PRS, an indication of a position of the second wireless device, a transmission timing of the PRS, an indication of a PRS pattern associated with the PRS, an indication of a transmission power associated with the PRS, or a combination thereof.

In some implementations, the communications manager 720 may be configured as or otherwise support a means for receiving an indication of SCI reserving a set of periodic resources of the resources allocated for selection by wireless devices for performing sidelink communications. In some implementations, the communications manager 720 may be configured as or otherwise support a means for receiving the PRS using the set of periodic resources.

In some implementations, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for sidelink sensing and positioning as described herein, or the processor 740 and the memory 730 may be otherwise configured to perform or support such operations.

Figure 8:
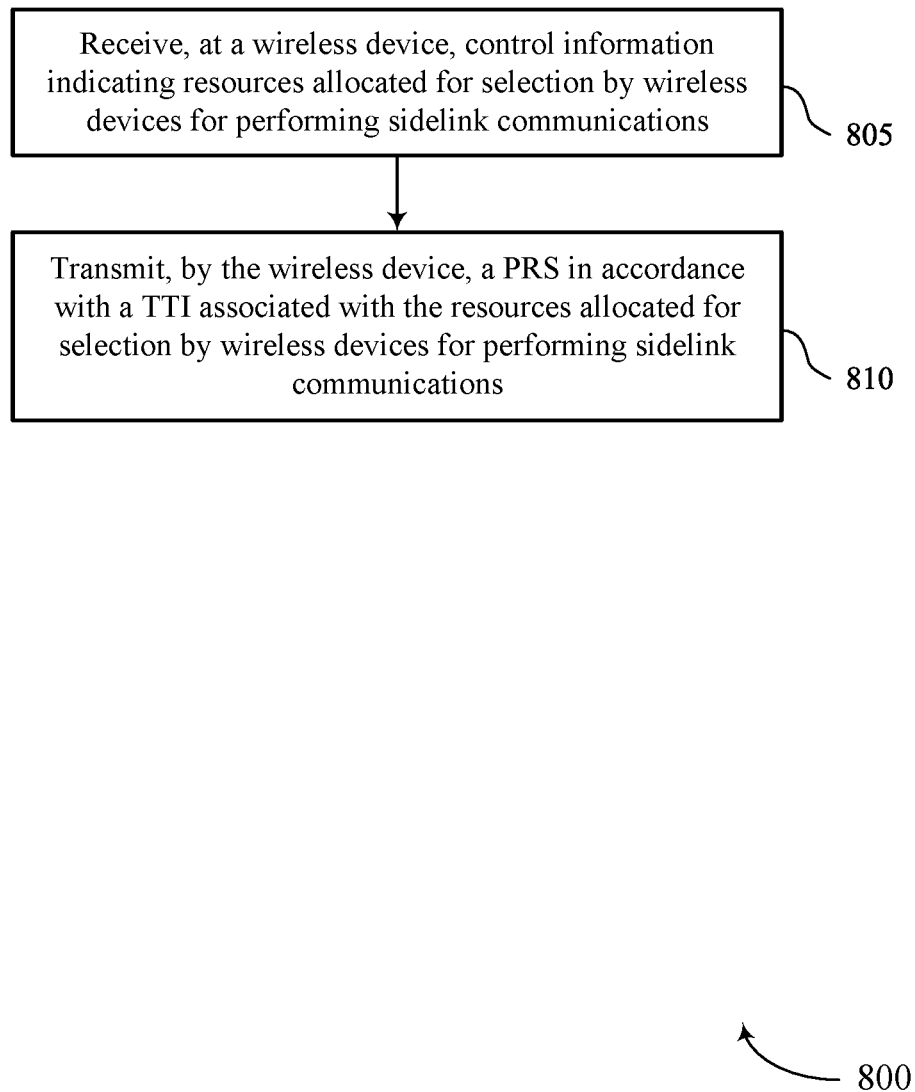
FIGS. 8 and 9 show flowcharts illustrating example methods that support techniques for sidelink sensing and positioning.

FIG. 8 shows a flowchart illustrating an example method 800 that supports techniques for sidelink sensing and positioning. The operations of the method 800 may be implemented by a UE or its components as described herein. For example, the operations of the method 800 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 805, the method may include receiving, at a wireless device, control information indicating resources allocated for selection by wireless devices for performing sidelink communications. The operations of 805 may be performed in accordance with examples as disclosed herein. In some implementations, aspects of the operations of 805 may be performed by a communications manager 720 as described with reference to FIG. 7.

At 810, the method may include transmitting, by the wireless device, a PRS in accordance with a TTI associated with the resources allocated for selection by wireless devices for performing sidelink communications. The operations of 810 may be performed in accordance with examples as disclosed herein. In some implementations, aspects of the operations of 810 may be performed by a communications manager 720 as described with reference to FIG. 7.

Figure 9:
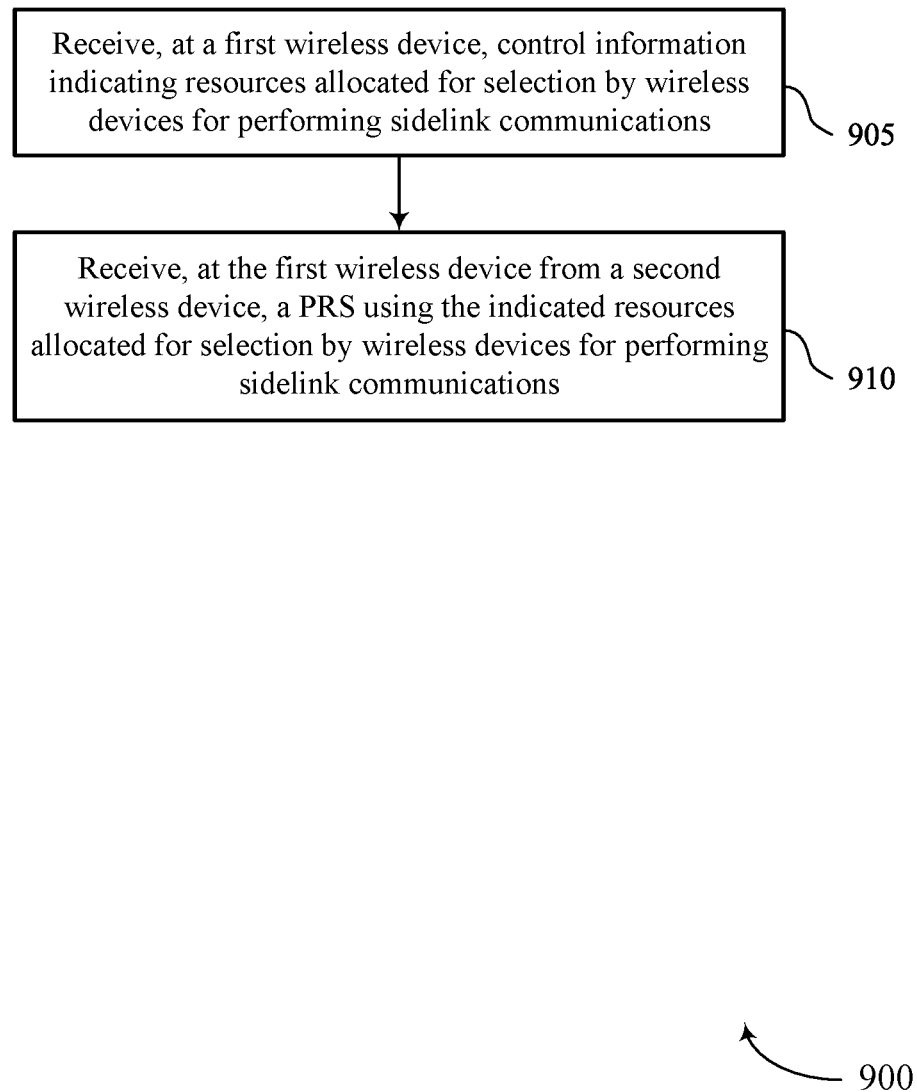

FIG. 9 shows a flowchart illustrating an example method 900 that supports techniques for sidelink sensing and positioning. The operations of the method 900 may be implemented by a UE or its components as described herein. For example, the operations of the method 900 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 905, the method may include receiving, at a first wireless device, control information indicating resources allocated for selection by wireless devices for performing sidelink communications. The operations of 905 may be performed in accordance with examples as disclosed herein. In some implementations, aspects of the operations of 905 may be performed by a communications manager 720 as described with reference to FIG. 7.

At 910, the method may include receiving, at the first wireless device from a second wireless device, a PRS using the indicated resources allocated for selection by wireless devices for performing sidelink communications. The operations of 910 may be performed in accordance with examples as disclosed herein. In some implementations, aspects of the operations of 910 may be performed by a communications manager 720 as described with reference to FIG. 7.

The following provides an overview of some aspects of the present disclosure:

Aspect 1: A method for wireless communication, including: receiving, at a wireless device, control information indicating resources allocated for selection by wireless devices for performing sidelink communications; and transmitting, by the wireless device, a PRS in accordance with a TTI associated with the resources allocated for selection by wireless devices for performing sidelink communications.

Aspect 2: The method of aspect 1, further including: receiving, from a second wireless device, a PRS request, where transmitting the PRS is associated with receiving the PRS request.

Aspect 3: The method of any of aspects 1 or 2, further including: receiving, from a second wireless device, a second PRS in response to transmitting the PRS.

Aspect 4: The method of aspect 3, further including: transmitting an indication of a position or a distance of the second wireless device calculated in accordance with an RTT associated with the transmitting of the PRS and the receiving of the second PRS.

Aspect 5: The method of any of aspects 3 or 4, further including: transmitting, via SCI associated with the TTI, an indication of a resource to be used for transmission of the second PRS; and receiving the second PRS using the indicated resource.

Aspect 6: The method of any of aspects 1 or 2, further including: receiving, from a second wireless device, a second PRS preceding the transmitting of the PRS, where transmitting the PRS is associated with receiving the second PRS.

Aspect 7: The method of aspect 6, further including: receiving, via SCI associated with the second PRS, an indication of a resource to be used for the transmission of the PRS; and transmitting the PRS using the indicated resource.

Aspect 8: The method of aspect 6, further including: performing a channel sensing procedure associated with one or more candidate transmission occasions as a result of receiving the second PRS; and transmitting the PRS using an available transmission occasion, of the one or more candidate transmission occasions, identified as a result of the channel sensing procedure.

Aspect 9: The method of any of aspects 1-8, where the TTI includes a slot format that is dedicated for sidelink PRS transmission.

Aspect 10: The method of aspect 9, where the slot format includes a PSCCH portion, a second stage SCI portion, one or more DMRS portions, a PRS burst portion, and one or more gap durations adjacent to the PRS burst portion.

Aspect 11: The method of aspect 10, further including: transmitting control signaling indicating one or both of the slot format or a PRS pattern for the transmission of the PRS; and transmitting the PRS during the PRS burst portion and using one or both of the slot format or the PRS pattern.

Aspect 12: The method of any of aspects 10 or 11, where transmitting the PRS includes: transmitting the PRS during the PRS burst portion using a first transmit power that is different than a second transmit power used for a transmission in accordance with another portion of the slot format.

Aspect 13: The method of any of aspects 1-12, further including: transmitting, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

Aspect 14: The method of any of aspects 1-7 or 9-13, further including: transmitting an indication of SCI reserving a set of periodic resources of the resources allocated to sidelink communications; and transmitting the PRS using the set of periodic resources.

Aspect 15: The method of any of aspects 1-14, further including: transmitting, by the wireless device and in accordance with the TTI, a second PRS using a different sub-channel or using a different resource pool than the PRS, the transmission of the second PRS having phase continuity with the transmission of the PRS.

Aspect 16: The method of any of aspects 1-15, where the PRS is transmitted using resources, of the resources allocated for selection by wireless devices for performing sidelink communications, that are dedicated for PRS transmissions.

Aspect 17: The method of any of aspects 1-6 or 8-16, further including: performing a channel sensing procedure associated with the resources allocated for selection by wireless devices for performing sidelink communications; and transmitting, in accordance with the TTI and using a set of resources, of the resources allocated for selection by wireless devices for performing sidelink communications, identified as a result of the channel sensing procedure, the PRS and an indication of SCI reserving the set of resources.

Aspect 18: A method for wireless communication, including: receiving, at a first wireless device, control information indicating resources allocated for selection by wireless devices for performing sidelink communications; and receiving, at the first wireless device from a second wireless device, a PRS using the indicated resources allocated for selection by wireless devices for performing sidelink communications.

Aspect 19: The method of aspect 18, further including: transmitting a PRS request, where receiving the PRS is associated with transmitting the PRS request.

Aspect 20: The method of aspect 19, where the PRS request includes an indication of SCI, an indication of a MAC-CE, or RRC signaling.

Aspect 21: The method of any of aspects 19 or 20, further including: receiving, via SCI associated with the PRS, an indication of a position of the second wireless device and an indication of a transmission timing of the PRS from the second wireless device, where a position of the first wireless device is determined using the indicated position of the second wireless device and the indicated transmission timing of the PRS from the second wireless device.

Aspect 22: The method of any of aspects 19-21, further including: receiving, via SCI associated with the PRS, an indication of a position of the second wireless device and an indication of a transmission timing of the PRS from the second wireless device; and reporting, to a third wireless device, an indication of a timing associated with receiving the PRS from the second wireless device.

Aspect 23: The method of any of aspects 18-22, further including: transmitting a second PRS, where receiving the PRS is associated with transmitting the second PRS.

Aspect 24: The method of aspect 23, further including: transmitting an indication of a position or a distance of the second wireless device calculated in accordance with an RTT associated with the transmitting of the second PRS and the receiving of the PRS.

Aspect 25: The method of any of aspects 23 or 24, further including: transmitting, using SCI associated with the transmitting of the second PRS, an indication reserving a portion of the resources allocated for selection by wireless devices for performing sidelink communication; and receiving the PRS using the reserved portion of the resources allocated for selection by wireless devices for performing sidelink communications.

Aspect 26: The method of any of aspects 18-25, further including: receiving, via SCI associated with the PRS, an indication of a slot format dedicated for PRS transmissions; and receiving the PRS in accordance with the indicated slot format.

Aspect 27: The method of aspect 26, where the slot format includes a PSCCH portion, a second stage SCI portion, one or more DMRS portions, one or more gap durations, and a PRS burst portion.

Aspect 28: The method of aspect 27, further including: receiving control signaling indicating one or both of the slot format or a PRS pattern for the PRS; and receiving the PRS during the PRS burst portion and using the one or both of the slot format or the PRS pattern.

Aspect 29: The method of any of aspects 18-28, further including: receiving, via SCI associated with the PRS, an indication of a position of the second wireless device, a transmission timing of the PRS, an indication of a PRS pattern associated with the PRS, an indication of a transmission power associated with the PRS, or a combination thereof.

Aspect 30: The method of any of aspects 18-29, further including: receiving an indication of SCI reserving a set of periodic resources of the resources allocated for selection by wireless devices for performing sidelink communications; and receiving the PRS using the set of periodic resources.

Aspect 31: An apparatus for wireless communication, including: a first interface configured to: obtain, at a wireless device, control information indicating resources allocated for selection by wireless devices for performing sidelink communications; and the first interface or a second interface configured to: output, by the wireless device, a PRS in accordance with a TTI associated with the resources allocated for selection by wireless devices for performing sidelink communications.

Aspect 32: The apparatus of aspect 31, where the first interface or the second interface is further configured to: obtain, from a second wireless device, a PRS request, where outputting the PRS is associated with obtaining the PRS request.

Aspect 33: The apparatus of any of aspects 31 or 32, where the first interface or the second interface is further configured to: obtain, from a second wireless device, a second PRS in response to outputting the PRS.

Aspect 34: The apparatus of aspect 33, where the first interface or the second interface is further configured to: output an indication of a position or a distance of the second wireless device calculated in accordance with an RTT associated with the outputting of the PRS and the obtaining of the second PRS.

Aspect 35: The apparatus of any of aspects 33 or 34, where the first interface or the second interface is further configured to: output, via SCI associated with the TTI, an indication of a resource to be used for outputting the second PRS; and obtain the second PRS using the indicated resource.

Aspect 36: The apparatus of any of aspects 31 or 32, where the first interface or the second interface is further configured to: obtain, from a second wireless device, a second PRS preceding the outputting of the PRS, where outputting the PRS is associated with obtaining the second PRS.

Aspect 37: The apparatus of aspect 36, where the first interface or the second interface is further configured to: obtain, via SCI associated with the second PRS, an indication of a resource to be used for the outputting of the PRS; and output the PRS using the indicated resource.

Aspect 38: The apparatus of aspect 36, further including a processing system, where: the processing system is configured to: perform a channel sensing procedure associated with one or more candidate transmission occasions as a result of obtaining the second PRS; and the first interface or the second interface is further configured to: output the PRS using an available transmission occasion, of the one or more candidate transmission occasions, identified as a result of the channel sensing procedure.

Aspect 39: The apparatus of any of aspects 31-38, where the TTI includes a slot format that is dedicated for sidelink PRS transmission.

Aspect 40: The apparatus of aspect 39, where the slot format includes a PSCCH portion, a second stage SCI portion, one or more DMRS portions, a PRS burst portion, and one or more gap durations adjacent to the PRS burst portion.

Aspect 41: The apparatus of aspect 40, where the first interface or the second interface is further configured to: output control signaling indicating one or both of the slot format or a PRS pattern for the outputting of the PRS; and output the PRS during the PRS burst portion and using one or both of the slot format or the PRS pattern.

Aspect 42: The apparatus of any of aspects 40 or 41, where the first interface or the second interface is further configured to: output the PRS during the PRS burst portion using a first output power that is different than a second output power used for a transmission in accordance with another portion of the slot format.

Aspect 43: The apparatus of any of aspects 31-42, where the first interface or the second interface is further configured to: output, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

Aspect 44: The apparatus of any of aspects 31-37 or 39-43, where the first interface or the second interface is further configured to: output an indication of SCI reserving a set of periodic resources of the resources allocated to sidelink communications; and output the PRS using the set of periodic resources.

Aspect 45: The apparatus of any of aspects 31-44, where the first interface or the second interface is further configured to: output, by the wireless device and in accordance with the TTI, a second PRS using a different sub-channel or using a different resource pool than the PRS, the outputting of the second PRS having phase continuity with the transmission of the PRS.

Aspect 46: The apparatus of any of aspects 31-45, where the PRS is output using resources, of the resources allocated for selection by wireless devices for performing sidelink communications, that are dedicated for PRS transmissions.

Aspect 47: The apparatus of any of aspects 31-36 or 38-46, further including a processing system, where: the processing system is configured to: perform a channel sensing procedure associated with the resources allocated for selection by wireless devices for performing sidelink communications; and the first interface or the second interface is further configured to: output, in accordance with the TTI and using a set of resources, of the resources allocated for selection by wireless devices for performing sidelink communications, identified as a result of the channel sensing procedure, the PRS and an indication of SCI reserving the set of resources.

Aspect 48: An apparatus for wireless communication, including: a first interface configured to: obtain, at a first wireless device, control information indicating resources allocated for selection by wireless devices for performing sidelink communications; and the first interface configured to: obtain, at the first wireless device from a second wireless device, a PRS using the indicated resources allocated for selection by wireless devices for performing sidelink communications.

Aspect 49: The apparatus of aspect 48, where the first interface or a second interface of the apparatus is configured to: output a PRS request, where obtaining the PRS is associated with outputting the PRS request.

Aspect 50: The apparatus of aspect 49, where the PRS request includes an indication of SCI, an indication of a MAC-CE, or RRC signaling.

Aspect 51: The apparatus of any of aspects 49 or 50, where the first interface or the second interface of the apparatus is configured to: obtain, via SCI associated with the PRS, an indication of a position of the second wireless device and an indication of a transmission timing of the PRS from the second wireless device, where a position of the first wireless device is determined using the indicated position of the second wireless device and the indicated transmission timing of the PRS from the second wireless device.

Aspect 52: The apparatus of any of aspects 49-51, where the first interface or the second interface of the apparatus is configured to: obtain, via SCI associated with the PRS, an indication of a position of the second wireless device and an indication of a transmission timing of the PRS from the second wireless device; and report, to a third wireless device, an indication of a timing associated with obtaining the PRS from the second wireless device.

Aspect 53: The apparatus of any of aspects 48-52, where the first interface or a second interface of the apparatus is configured to: output a second PRS, where obtaining the PRS is associated with outputting the second PRS.

Aspect 54: The apparatus of aspect 53, where the first interface or the second interface of the apparatus is configured to: output an indication of a position or a distance of the second wireless device calculated in accordance with an RTT associated with the outputting of the second PRS and the obtaining of the PRS.

Aspect 55: The apparatus of any of aspects 53 or 54, where the first interface or the second interface of the apparatus is configured to: output, using SCI associated with the outputting of the second PRS, an indication reserving a portion of the resources allocated for selection by wireless devices for performing sidelink communication; and obtain the PRS using the reserved portion of the resources allocated for selection by wireless devices for performing sidelink communications.

Aspect 56: The apparatus of any of aspects 48-55, where the first interface or a second interface of the apparatus is configured to: obtain, via SCI associated with the PRS, an indication of a slot format dedicated for PRS transmissions; and obtain the PRS in accordance with the indicated slot format.

Aspect 57: The apparatus of aspect 56, where the slot format includes a PSCCH portion, a second stage SCI portion, one or more DMRS portions, one or more gap durations, and a PRS burst portion.

Aspect 58: The apparatus of aspect 57, where the first interface or the second interface of the apparatus is configured to: obtain control signaling indicating one or both of the slot format or a PRS pattern for the PRS; and obtain the PRS during the PRS burst portion and using the one or both of the slot format or the PRS pattern.

Aspect 59: The apparatus of any of aspects 48-58, where the first interface or a second interface of the apparatus is configured to: obtain, via SCI associated with the PRS, an indication of a position of the second wireless device, a transmission timing of the PRS, an indication of a PRS pattern associated with the PRS, an indication of a transmission power associated with the PRS, or a combination thereof.

Aspect 60: The apparatus of any of aspects 48-59, where the first interface or a second interface of the apparatus is configured to: obtain an indication of SCI reserving a set of periodic resources of the resources allocated for selection by wireless devices for performing sidelink communications; and obtain the PRS using the set of periodic resources.

Aspect 61: An apparatus for wireless communication, including: a processor; memory coupled with the processor; and instructions stored in the memory and executable by the processor to cause the apparatus to: receive, at a wireless device, control information indicating resources allocated for selection by wireless devices for performing sidelink communications; and transmit, by the wireless device, a PRS in accordance with a TTI associated with the resources allocated for selection by wireless devices for performing sidelink communications.

Aspect 62: The apparatus of aspect 61, where the instructions are further executable by the processor to cause the apparatus to: receive, from a second wireless device, a PRS request, where transmitting the PRS is associated with receiving the PRS request.

Aspect 63: The apparatus of any of aspects 61 or 62, where the instructions are further executable by the processor to cause the apparatus to: receive, from a second wireless device, a second PRS in response to transmitting the PRS.

Aspect 64: The apparatus of aspect 63, where the instructions are further executable by the processor to cause the apparatus to: transmit an indication of a position or a distance of the second wireless device calculated in accordance with an RTT associated with the transmitting of the PRS and the receiving of the second PRS.

Aspect 65: The apparatus of any of aspects 63 or 64, where the instructions are further executable by the processor to cause the apparatus to: transmit, via SCI associated with the TTI, an indication of a resource to be used for transmission of the second PRS; and receive the second PRS using the indicated resource.

Aspect 66: The apparatus of any of aspects 61 or 62, where the instructions are further executable by the processor to cause the apparatus to: receive, from a second wireless device, a second PRS preceding the transmitting of the PRS, where transmitting the PRS is associated with receiving the second PRS.

Aspect 67: The apparatus of aspect 66, where the instructions are further executable by the processor to cause the apparatus to: receive, via SCI associated with the second PRS, an indication of a resource to be used for the transmission of the PRS; and transmit the PRS using the indicated resource.

Aspect 68: The apparatus of aspect 66, where the instructions are further executable by the processor to cause the apparatus to: perform a channel sensing procedure associated with one or more candidate transmission occasions as a result of receiving the second PRS; and transmit the PRS using an available transmission occasion, of the one or more candidate transmission occasions, identified as a result of the channel sensing procedure.

Aspect 69: The apparatus of any of aspects 61-68, where the TTI includes a slot format that is dedicated for sidelink PRS transmission.

Aspect 70: The apparatus of aspect 69, where the slot format includes a PSCCH portion, a second stage SCI portion, one or more DMRS portions, a PRS burst portion, and one or more gap durations adjacent to the PRS burst portion.

Aspect 71: The apparatus of aspect 70, where the instructions are further executable by the processor to cause the apparatus to: transmit control signaling indicating one or both of the slot format or a PRS pattern for the transmission of the PRS; and transmit the PRS during the PRS burst portion and using one or both of the slot format or the PRS pattern.

Aspect 72: The apparatus of any of aspects 70 or 71, where the instructions to transmit the PRS are executable by the processor to cause the apparatus to: transmit the PRS during the PRS burst portion using a first transmit power that is different than a second transmit power used for a transmission in accordance with another portion of the slot format.

Aspect 73: The apparatus of any of aspects 61-72, where the instructions are further executable by the processor to cause the apparatus to: transmit, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

Aspect 74: The apparatus of any of aspects 61-67 or 69-73, where the instructions are further executable by the processor to cause the apparatus to: transmit an indication of SCI reserving a set of periodic resources of the resources allocated to sidelink communications; and transmit the PRS using the set of periodic resources.

Aspect 75: The apparatus of any of aspects 61-74, where the instructions are further executable by the processor to cause the apparatus to: transmit, by the wireless device and in accordance with the TTI, a second PRS using a different sub-channel or using a different resource pool than the PRS, the transmission of the second PRS having phase continuity with the transmission of the PRS.

Aspect 76: The apparatus of any of aspects 61-75, where the PRS is transmitted using resources, of the resources allocated for selection by wireless devices for performing sidelink communications, that are dedicated for PRS transmissions.

Aspect 77: The apparatus of any of aspects 61-66 or 68-76, where the instructions are further executable by the processor to cause the apparatus to: perform a channel sensing procedure associated with the resources allocated for selection by wireless devices for performing sidelink communications; and transmit, in accordance with the TTI and using a set of resources, of the resources allocated for selection by wireless devices for performing sidelink communications, identified as a result of the channel sensing procedure, the PRS and an indication of SCI reserving the set of resources.

Aspect 78: An apparatus for wireless communication, including: a processor; memory coupled with the processor; and instructions stored in the memory and executable by the processor to cause the apparatus to: receive, at a first wireless device, control information indicating resources allocated for selection by wireless devices for performing sidelink communications; and receive, at the first wireless device from a second wireless device, a PRS using the indicated resources allocated for selection by wireless devices for performing sidelink communications.

Aspect 79: The apparatus of aspect 78, where the instructions are further executable by the processor to cause the apparatus to: transmit a PRS request, where receiving the PRS is associated with transmitting the PRS request.

Aspect 80: The apparatus of aspect 79, where the PRS request includes an indication of SCI, an indication of a MAC-CE, or RRC signaling.

Aspect 81: The apparatus of any of aspects 79 or 80, where the instructions are further executable by the processor to cause the apparatus to: receive, via SCI associated with the PRS, an indication of a position of the second wireless device and an indication of a transmission timing of the PRS from the second wireless device, where a position of the first wireless device is determined using the indicated position of the second wireless device and the indicated transmission timing of the PRS from the second wireless device.

Aspect 82: The apparatus of any of aspects 79-81, where the instructions are further executable by the processor to cause the apparatus to: receive, via SCI associated with the PRS, an indication of a position of the second wireless device and an indication of a transmission timing of the PRS from the second wireless device; and report, to a third wireless device, an indication of a timing associated with receiving the PRS from the second wireless device.

Aspect 83: The apparatus of any of aspects 78-82, where the instructions are further executable by the processor to cause the apparatus to: transmit a second PRS, where receiving the PRS is associated with transmitting the second PRS.

Aspect 84: The apparatus of aspect 83, where the instructions are further executable by the processor to cause the apparatus to: transmit an indication of a position or a distance of the second wireless device calculated in accordance with an RTT associated with the transmitting of the second PRS and the receiving of the PRS.

Aspect 85: The apparatus of any of aspects 83 or 84, where the instructions are further executable by the processor to cause the apparatus to: transmit, using SCI associated with the transmitting of the second PRS, an indication reserving a portion of the resources allocated for selection by wireless devices for performing sidelink communication; and receive the PRS using the reserved portion of the resources allocated for selection by wireless devices for performing sidelink communications.

Aspect 86: The apparatus of any of aspects 78-85, where the instructions are further executable by the processor to cause the apparatus to: receive, via SCI associated with the PRS, an indication of a slot format dedicated for PRS transmissions; and receive the PRS in accordance with the indicated slot format.

Aspect 87: The apparatus of aspect 86, where the slot format includes a PSCCH portion, a second stage SCI portion, one or more DMRS portions, one or more gap durations, and a PRS burst portion.

Aspect 88: The apparatus of aspect 87, where the instructions are further executable by the processor to cause the apparatus to: receive control signaling indicating one or both of the slot format or a PRS pattern for the PRS; and receive the PRS during the PRS burst portion and using the one or both of the slot format or the PRS pattern.

Aspect 89: The apparatus of any of aspects 78-88, where the instructions are further executable by the processor to cause the apparatus to: receive, via SCI associated with the PRS, an indication of a position of the second wireless device, a transmission timing of the PRS, an indication of a PRS pattern associated with the PRS, an indication of a transmission power associated with the PRS, or a combination thereof.

Aspect 90: The apparatus of any of aspects 78-89, where the instructions are further executable by the processor to cause the apparatus to: receive an indication of SCI reserving a set of periodic resources of the resources allocated for selection by wireless devices for performing sidelink communications; and receive the PRS using the set of periodic resources.

Aspect 91: An apparatus for wireless communication, including: means for receiving, at a wireless device, control information indicating resources allocated for selection by wireless devices for performing sidelink communications; and means for transmitting, by the wireless device, a PRS in accordance with a TTI associated with the resources allocated for selection by wireless devices for performing sidelink communications.

Aspect 92: The apparatus of aspect 91, further including: means for receiving, from a second wireless device, a PRS request, where transmitting the PRS is associated with receiving the PRS request.

Aspect 93: The apparatus of any of aspects 91 or 92, further including: means for receiving, from a second wireless device, a second PRS in response to transmitting the PRS.

Aspect 94: The apparatus of aspect 93, further including: means for transmitting an indication of a position or a distance of the second wireless device calculated in accordance with an RTT associated with the transmitting of the PRS and the receiving of the second PRS.

Aspect 95: The apparatus of any of aspects 93 or 94, further including: means for transmitting, via SCI associated with the TTI, an indication of a resource to be used for transmission of the second PRS; and means for receiving the second PRS using the indicated resource.

Aspect 96: The apparatus of any of aspects 91 or 92, further including: means for receiving, from a second wireless device, a second PRS preceding the transmitting of the PRS, where transmitting the PRS is associated with receiving the second PRS.

Aspect 97: The apparatus of aspect 96, further including: means for receiving, via SCI associated with the second PRS, an indication of a resource to be used for the transmission of the PRS; and means for transmitting the PRS using the indicated resource.

Aspect 98: The apparatus of aspect 96, further including: means for performing a channel sensing procedure associated with one or more candidate transmission occasions as a result of receiving the second PRS; and means for transmitting the PRS using an available transmission occasion, of the one or more candidate transmission occasions, identified as a result of the channel sensing procedure.

Aspect 99: The apparatus of any of aspects 91-98, where the TTI includes a slot format that is dedicated for sidelink PRS transmission.

Aspect 100: The apparatus of aspect 99, where the slot format includes a PSCCH portion, a second stage SCI portion, one or more DMRS portions, a PRS burst portion, and one or more gap durations adjacent to the PRS burst portion.

Aspect 101: The apparatus of aspect 100, further including: means for transmitting control signaling indicating one or both of the slot format or a PRS pattern for the transmission of the PRS; and means for transmitting the PRS during the PRS burst portion and using one or both of the slot format or the PRS pattern.

Aspect 102: The apparatus of any of aspects 100 or 101, where the means for transmitting the PRS include: means for transmitting the PRS during the PRS burst portion using a first transmit power that is different than a second transmit power used for a transmission in accordance with another portion of the slot format.

Aspect 103: The apparatus of any of aspects 91-102, further including: means for transmitting, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

Aspect 104: The apparatus of any of aspects 91-97 or 99-103, further including: means for transmitting an indication of SCI reserving a set of periodic resources of the resources allocated to sidelink communications; and means for transmitting the PRS using the set of periodic resources.

Aspect 105: The apparatus of any of aspects 91-104, further including: means for transmitting, by the wireless device and in accordance with the TTI, a second PRS using a different sub-channel or using a different resource pool than the PRS, the transmission of the second PRS having phase continuity with the transmission of the PRS.

Aspect 106: The apparatus of any of aspects 91-105, where the PRS is transmitted using resources, of the resources allocated for selection by wireless devices for performing sidelink communications, that are dedicated for PRS transmissions.

Aspect 107: The apparatus of any of aspects 91-96 or 98-106, further including: means for performing a channel sensing procedure associated with the resources allocated for selection by wireless devices for performing sidelink communications; and means for transmitting, in accordance with the TTI and using a set of resources, of the resources allocated for selection by wireless devices for performing sidelink communications, identified as a result of the channel sensing procedure, the PRS and an indication of SCI reserving the set of resources.

Aspect 108: An apparatus for wireless communication, including: means for receiving, at a first wireless device, control information indicating resources allocated for selection by wireless devices for performing sidelink communications; and means for receiving, at the first wireless device from a second wireless device, a PRS using the indicated resources allocated for selection by wireless devices for performing sidelink communications.

Aspect 109: The apparatus of aspect 108, further including: means for transmitting a PRS request, where receiving the PRS is associated with transmitting the PRS request.

Aspect 110: The apparatus of aspect 109, where the PRS request includes an indication of SCI, an indication of a MAC-CE, or RRC signaling.

Aspect 111: The apparatus of any of aspects 109 or 110, further including: means for receiving, via SCI associated with the PRS, an indication of a position of the second wireless device and an indication of a transmission timing of the PRS from the second wireless device, where a position of the first wireless device is determined using the indicated position of the second wireless device and the indicated transmission timing of the PRS from the second wireless device.

Aspect 112: The apparatus of any of aspects 109-111, further including: means for receiving, via SCI associated with the PRS, an indication of a position of the second wireless device and an indication of a transmission timing of the PRS from the second wireless device; and means for reporting, to a third wireless device, an indication of a timing associated with receiving the PRS from the second wireless device.

Aspect 113: The apparatus of any of aspects 108-112, further including: means for transmitting a second PRS, where receiving the PRS is associated with transmitting the second PRS.

Aspect 114: The apparatus of aspect 113, further including: means for transmitting an indication of a position or a distance of the second wireless device calculated in accordance with an RTT associated with the transmitting of the second PRS and the receiving of the PRS.

Aspect 115: The apparatus of any of aspects 113 or 114, further including: means for transmitting, using SCI associated with the transmitting of the second PRS, an indication reserving a portion of the resources allocated for selection by wireless devices for performing sidelink communication; and means for receiving the PRS using the reserved portion of the resources allocated for selection by wireless devices for performing sidelink communications.

Aspect 116: The apparatus of any of aspects 108-115, further including: means for receiving, via SCI associated with the PRS, an indication of a slot format dedicated for PRS transmissions; and means for receiving the PRS in accordance with the indicated slot format.

Aspect 117: The apparatus of aspect 116, where the slot format includes a PSCCH portion, a second stage SCI portion, one or more DMRS portions, one or more gap durations, and a PRS burst portion.

Aspect 118: The apparatus of aspect 117, further including: means for receiving control signaling indicating one or both of the slot format or a PRS pattern for the PRS; and means for receiving the PRS during the PRS burst portion and using the one or both of the slot format or the PRS pattern.

Aspect 119: The apparatus of any of aspects 108-118, further including: means for receiving, via SCI associated with the PRS, an indication of a position of the second wireless device, a transmission timing of the PRS, an indication of a PRS pattern associated with the PRS, an indication of a transmission power associated with the PRS, or a combination thereof.

Aspect 120: The apparatus of any of aspects 108-119, further including: means for receiving an indication of SCI reserving a set of periodic resources of the resources allocated for selection by wireless devices for performing sidelink communications; and means for receiving the PRS using the set of periodic resources.

Aspect 121: A non-transitory computer-readable medium storing code for wireless communication, the code including instructions executable by a processor to: receive, at a wireless device, control information indicating resources allocated for selection by wireless devices for performing sidelink communications; and transmit, by the wireless device, a PRS in accordance with a TTI associated with the resources allocated for selection by wireless devices for performing sidelink communications.

Aspect 122: The non-transitory computer-readable medium of aspect 121, where the instructions are further executable by the processor to: receive, from a second wireless device, a PRS request, where transmitting the PRS is associated with receiving the PRS request.

Aspect 123: The non-transitory computer-readable medium of any of aspects 121 or 122, where the instructions are further executable by the processor to: receive, from a second wireless device, a second PRS in response to transmitting the PRS.

Aspect 124: The non-transitory computer-readable medium of aspect 123, where the instructions are further executable by the processor to: transmit an indication of a position or a distance of the second wireless device calculated in accordance with an RTT associated with the transmitting of the PRS and the receiving of the second PRS.

Aspect 125: The non-transitory computer-readable medium of any of aspects 123 or 124, where the instructions are further executable by the processor to:

transmit, via SCI associated with the TTI, an indication of a resource to be used for transmission of the second PRS; and receive the second PRS using the indicated resource.

Aspect 126: The non-transitory computer-readable medium of any of aspects 121 or 122, where the instructions are further executable by the processor to: receive, from a second wireless device, a second PRS preceding the transmitting of the PRS, where transmitting the PRS is associated with receiving the second PRS.

Aspect 127: The non-transitory computer-readable medium of aspect 126, where the instructions are further executable by the processor to: receive, via SCI associated with the second PRS, an indication of a resource to be used for the transmission of the PRS; and transmit the PRS using the indicated resource.

Aspect 128: The non-transitory computer-readable medium of aspect 126, where the instructions are further executable by the processor to: perform a channel sensing procedure associated with one or more candidate transmission occasions as a result of receiving the second PRS; and transmit the PRS using an available transmission occasion, of the one or more candidate transmission occasions, identified as a result of the channel sensing procedure.

Aspect 129: The non-transitory computer-readable medium of any of aspects 121-128, where the TTI includes a slot format that is dedicated for sidelink PRS transmission.

Aspect 130: The non-transitory computer-readable medium of aspect 129, where the slot format includes a PSCCH portion, a second stage SCI portion, one or more DMRS portions, a PRS burst portion, and one or more gap durations adjacent to the PRS burst portion.

Aspect 131: The non-transitory computer-readable medium of aspect 130, where the instructions are further executable by the processor to: transmit control signaling indicating one or both of the slot format or a PRS pattern for the transmission of the PRS; and transmit the PRS during the PRS burst portion and using one or both of the slot format or the PRS pattern.

Aspect 132: The non-transitory computer-readable medium of any of aspects 130 or 131, where the instructions to transmit the PRS are executable by the processor to: transmit the PRS during the PRS burst portion using a first transmit power that is different than a second transmit power used for a transmission in accordance with another portion of the slot format.

Aspect 133: The non-transitory computer-readable medium of any of aspects 121-132, where the instructions are further executable by the processor to: transmit, via SCI associated with the PRS, an indication of a position of the wireless device, a transmission timing of the transmission of the PRS, an indication of a PRS pattern associated with the transmission of the PRS, an indication of a PRS pattern for a responsive PRS, an indication of a transmission power for the PRS, or any combination thereof.

Aspect 134: The non-transitory computer-readable medium of any of aspects 121-127 or 129-133, where the instructions are further executable by the processor to: transmit an indication of SCI reserving a set of periodic resources of the resources allocated to sidelink communications; and transmit the PRS using the set of periodic resources.

Aspect 135: The non-transitory computer-readable medium of any of aspects 121-134, where the instructions are further executable by the processor to: transmit, by the wireless device and in accordance with the TTI, a second PRS using a different sub-channel or using a different resource pool than the PRS, the transmission of the second PRS having phase continuity with the transmission of the PRS.

Aspect 136: The non-transitory computer-readable medium of any of aspects 121-135, where the PRS is transmitted using resources, of the resources allocated for selection by wireless devices for performing sidelink communications, that are dedicated for PRS transmissions.

Aspect 137: The non-transitory computer-readable medium of any of aspects 121-126 or 128-136, where the instructions are further executable by the processor to: perform a channel sensing procedure associated with the resources allocated for selection by wireless devices for performing sidelink communications; and transmit, in accordance with the TTI and using a set of resources, of the resources allocated for selection by wireless devices for performing sidelink communications, identified as a result of the channel sensing procedure, the PRS and an indication of SCI reserving the set of resources.

Aspect 138: A non-transitory computer-readable medium storing code for wireless communication, the code including instructions executable by a processor to: receive, at a first wireless device, control information indicating resources allocated for selection by wireless devices for performing sidelink communications; and receive, at the first wireless device from a second wireless device, a PRS using the indicated resources allocated for selection by wireless devices for performing sidelink communications.

Aspect 139: The non-transitory computer-readable medium of aspect 138, where the instructions are further executable by the processor to: transmit a PRS request, where receiving the PRS is associated with transmitting the PRS request.

Aspect 140: The non-transitory computer-readable medium of aspect 139, where the PRS request includes an indication of SCI, an indication of a MAC-CE, or RRC signaling.

Aspect 141: The non-transitory computer-readable medium of any of aspects 139 or 140, where the instructions are further executable by the processor to: receive, via SCI associated with the PRS, an indication of a position of the second wireless device and an indication of a transmission timing of the PRS from the second wireless device, where a position of the first wireless device is determined using the indicated position of the second wireless device and the indicated transmission timing of the PRS from the second wireless device.

Aspect 142: The non-transitory computer-readable medium of any of aspects 139-141, where the instructions are further executable by the processor to: receive, via SCI associated with the PRS, an indication of a position of the second wireless device and an indication of a transmission timing of the PRS from the second wireless device; and report, to a third wireless device, an indication of a timing associated with receiving the PRS from the second wireless device.

Aspect 143: The non-transitory computer-readable medium of any of aspects 138-142, where the instructions are further executable by the processor to: transmit a second PRS, where receiving the PRS is associated with transmitting the second PRS.

Aspect 144: The non-transitory computer-readable medium of aspect 143, where the instructions are further executable by the processor to: transmit an indication of a position or a distance of the second wireless device calculated in accordance with an RTT associated with the transmitting of the second PRS and the receiving of the PRS.

Aspect 145: The non-transitory computer-readable medium of any of aspects 143 or 144, where the instructions are further executable by the processor to: transmit, using SCI associated with the transmitting of the second PRS, an indication reserving a portion of the resources allocated for selection by wireless devices for performing sidelink communication; and receive the PRS using the reserved portion of the resources allocated for selection by wireless devices for performing sidelink communications.

Aspect 146: The non-transitory computer-readable medium of any of aspects 138-145, where the instructions are further executable by the processor to: receive, via SCI associated with the PRS, an indication of a slot format dedicated for PRS transmissions; and receive the PRS in accordance with the indicated slot format.

Aspect 147: The non-transitory computer-readable medium of aspect 146, where the slot format includes a PSCCH portion, a second stage SCI portion, one or more DMRS portions, one or more gap durations, and a PRS burst portion.

Aspect 148: The non-transitory computer-readable medium of aspect 147, where the instructions are further executable by the processor to: receive control signaling indicating one or both of the slot format or a PRS pattern for the PRS; and receive the PRS during the PRS burst portion and using the one or both of the slot format or the PRS pattern.

Aspect 149: The non-transitory computer-readable medium of any of aspects 138-148, where the instructions are further executable by the processor to: receive, via SCI associated with the PRS, an indication of a position of the second wireless device, a transmission timing of the PRS, an indication of a PRS pattern associated with the PRS, an indication of a transmission power associated with the PRS, or a combination thereof.

Aspect 150: The non-transitory computer-readable medium of any of aspects 138-149, where the instructions are further executable by the processor to: receive an indication of SCI reserving a set of periodic resources of the resources allocated for selection by wireless devices for performing sidelink communications; and receive the PRS using the set of periodic resources.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a–b, a–c, b–c, and a–b–c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a wireless device, comprising:
a processing system that includes one or more processors and one or more memories coupled with the one or more processors, the processing system configured to cause the apparatus to:
receive an indication of a resource pool associated with sidelink positioning reference signal transmissions; and
transmit, via a plurality of resource pools including the resource pool associated with the sidelink positioning reference signal transmissions, a first plurality of sidelink positioning reference signals including a first sidelink positioning reference signal, the first sidelink positioning reference signal transmitted via a bandwidth of the resource pool associated with the sidelink positioning reference signal transmissions.

2. The apparatus of claim 1, wherein the resource pool is dedicated for the sidelink positioning reference signal transmissions.

3. The apparatus of claim 1, wherein the indication of the resource pool is received via configuration signaling from a network entity.

4. The apparatus of claim 1, wherein the processing system is further configured to cause the apparatus to:
transmit the first sidelink positioning reference signal via unicast signaling.

5. The apparatus of claim 1, wherein the processing system is further configured to cause the apparatus to:
transmit the first sidelink positioning reference signal via multicast signaling or broadcast signaling.

6. The apparatus of claim 1, wherein the processing system is further configured to cause the apparatus to:
transmit the first sidelink positioning reference signal via a plurality of sub-channels within the resource pool associated with the sidelink positioning reference signal transmissions.

7. The apparatus of claim 1, wherein the apparatus transmits the first plurality of sidelink positioning reference signals within a same slot or within a configured duration.

8. The apparatus of claim 1, wherein the processing system is further configured to cause the apparatus to:
receive, from a second wireless device via the bandwidth of the resource pool associated with the sidelink positioning reference signal transmissions, a second sidelink positioning reference signal.

9. The apparatus of claim 8, wherein the processing system is further configured to cause the apparatus to:
receive a second plurality of sidelink positioning reference signals via a second plurality of resource pools, wherein the second plurality of sidelink positioning reference signals includes the second sidelink positioning reference signal, and wherein the second plurality of resource pools includes the resource pool associated with the sidelink positioning reference signal transmissions; and
combine the second plurality of sidelink positioning reference signals into a wideband sidelink positioning reference signal.

10. The apparatus of claim 1, wherein the processing system is further configured to cause the apparatus to:
transmit, via sidelink control information, an indication of a reservation of the resource pool for the first sidelink positioning reference signal, wherein transmitting the first sidelink positioning reference signal is in accordance with the reservation of the resource pool for the first sidelink positioning reference signal.

11. The apparatus of claim 1, wherein the processing system is further configured to cause the apparatus to:
transmit, via sidelink control information, an indication of one or both of a slot format or a positioning reference signal pattern associated with the first sidelink positioning reference signal, wherein transmitting the first sidelink positioning reference signal is in accordance with the slot format or the positioning reference signal pattern.

12. The apparatus of claim 1, wherein the processing system is further configured to cause the apparatus to:
transmit, via sidelink control information, an indication of a position of the wireless device, a transmission timing of the first sidelink positioning reference signal, an indication of a positioning reference signal pattern for a second sidelink positioning reference signal transmitted by a second wireless device in response to the first sidelink positioning reference signal, an indication of a transmission power for the first sidelink positioning reference signal, or any combination thereof.

13. An apparatus for wireless communication at a wireless device, comprising:
a processing system that includes one or more processors and one or more memories coupled with the one or more processors, the processing system configured to cause the apparatus to:
receive an indication of a resource pool associated with sidelink positioning reference signal transmissions; and
receive, via a plurality of resource pools including the resource pool associated with the sidelink positioning reference signal transmissions, a first plurality of sidelink positioning reference signals including a first sidelink positioning reference signal, the first sidelink positioning reference signal received via a bandwidth of the resource pool associated with the sidelink positioning reference signal transmissions.

14. The apparatus of claim 13, wherein the resource pool is dedicated for the sidelink positioning reference signal transmissions.

15. The apparatus of claim 13, wherein the indication of the resource pool is received via configuration signaling from a network entity.

16. The apparatus of claim 13, wherein the processing system is further configured to cause the wireless device to:
transmit the first sidelink positioning reference signal via unicast signaling.

17. The apparatus of claim 13, wherein the processing system is further configured to cause the apparatus to:
transmit the first sidelink positioning reference signal via multicast signaling or broadcast signaling.

18. A method for wireless communication at a wireless device, comprising:
receiving an indication of a resource pool associated with sidelink positioning reference signal transmissions; and
transmitting, via a plurality of resource pools including the resource pool associated with the sidelink positioning reference signal transmissions, a first plurality of sidelink positioning reference signals including a first sidelink positioning reference signal, the first sidelink positioning reference signal transmitted via a bandwidth of the resource pool associated with the sidelink positioning reference signal transmissions.

19. The method of claim 18, wherein the resource pool is dedicated for the sidelink positioning reference signal transmissions.

* * * * *